United States Patent
Popkiewicz et al.

(10) Patent No.: US 10,362,364 B2
(45) Date of Patent: Jul. 23, 2019

(54) PROCESS AND APPARATUS FOR ADVERTISING COMPONENT PLACEMENT

(71) Applicant: MirriAd Advertising Limited, London (GB)

(72) Inventors: Mark Popkiewicz, Cranbourne (GB); Philip McLauchlan, Epsom (GB)

(73) Assignee: MirriAd Advertising PLC, London (GB)

( * ) Notice: Subject to any disclaimer, the term of this patent is extended or adjusted under 35 U.S.C. 154(b) by 406 days.

(21) Appl. No.: 14/542,321

(22) Filed: Nov. 14, 2014

(65) Prior Publication Data
US 2015/0106845 A1    Apr. 16, 2015

Related U.S. Application Data

(63) Continuation of application No. 11/701,822, filed on Feb. 2, 2007, now abandoned.

(30) Foreign Application Priority Data

Nov. 23, 2006 (GB) .................................. 0623411.6
Dec. 12, 2006 (GB) .................................. 0624789.4

(51) Int. Cl.
*G06Q 30/02* (2012.01)
*G06Q 30/06* (2012.01)
(Continued)

(52) U.S. Cl.
CPC ........... *H04N 21/812* (2013.01); *G06Q 30/02* (2013.01); *G06Q 30/0601* (2013.01);
(Continued)

(58) Field of Classification Search
USPC ................. 726/2; 725/34, 32, 24; 463/42, 1; 705/14.51; 348/700
See application file for complete search history.

(56) References Cited

U.S. PATENT DOCUMENTS 5,060,068 A    10/1991    Lindstrom
5,933,811 A    8/1999    Angles et al.
(Continued)

FOREIGN PATENT DOCUMENTS

EP             1168210          1/2002
WO    WO-2004055807 A1 *    7/2004    ......... G06Q 30/0207

OTHER PUBLICATIONS

The Advertising Component—Colorado SBDC (John W. Hickenlooper) (Year: 2013).*

*Primary Examiner* — Tarek Elchanti
(74) *Attorney, Agent, or Firm* — Maschoff Brennan

(57) ABSTRACT

A method of digital advertising, comprising: receiving a plurality of video material sources; optionally converting video material from a format of said sources into one or more placement operating formats; placing a digital advertising component into video material; and outputting the video material with the digital advertising component integrated within it for distribution. Preferred embodiments of the invention involve generating a market for placement zones suitable for receiving digital advertising components, wherein a market is generated by for example a bidding process against one or more available placement zones or offering one or more available placement zones with an indication its value/price. Also disclosed are computer apparatus and systems for performing the above-mentioned methods and related methods, and a system and method for management and manipulation of digital assets.

22 Claims, 12 Drawing Sheets

(51) Int. Cl.
  *G11B 27/28*   (2006.01)
  *H04N 21/81*   (2011.01)
  *G11B 27/036*  (2006.01)
  *H04N 21/234*  (2011.01)

(52) U.S. Cl.
  CPC ............ *G11B 27/036* (2013.01); *G11B 27/28* (2013.01); *H04N 21/23424* (2013.01)

(56) References Cited

U.S. PATENT DOCUMENTS

| | | | | |
|---|---|---|---|---|
| 6,029,045 | A * | 2/2000 | Picco | H04N 7/165 |
| | | | | 348/E5.002 |
| 6,036,601 | A * | 3/2000 | Heckel | G06Q 30/02 |
| | | | | 273/461 |
| 6,704,930 | B1 | 3/2004 | Eldering et al. | |
| 7,062,510 | B1 | 6/2006 | Eldering | |
| 7,689,062 | B2 | 3/2010 | Baharav et al. | |
| 7,870,577 | B2 | 11/2011 | Haberman | |
| 2001/0013039 | A1 | 8/2001 | Choi | |
| 2001/0037465 | A1 | 11/2001 | Hart, III et al. | |
| 2002/0004743 | A1 | 1/2002 | Kutaragi et al. | |
| 2002/0080284 | A1 * | 6/2002 | Kim | H04N 5/144 |
| | | | | 348/700 |
| 2002/0097235 | A1 | 7/2002 | Rosenberg et al. | |
| 2002/0161635 | A1 | 10/2002 | Berg et al. | |
| 2003/0014310 | A1 | 1/2003 | Jung et al. | |
| 2003/0028432 | A1 | 2/2003 | Troyansky et al. | |
| 2003/0135460 | A1 | 7/2003 | Talegon | |
| 2003/0187741 | A1 | 10/2003 | Brown et al. | |
| 2004/0116183 | A1 | 6/2004 | Prindle | |
| 2004/0148221 | A1 * | 7/2004 | Chu | A63F 13/12 |
| | | | | 705/14.51 |
| 2005/0137958 | A1 | 6/2005 | Huber et al. | |
| 2005/0203796 | A1 | 9/2005 | Anand et al. | |
| 2006/0026628 | A1 * | 2/2006 | Wan | H04N 5/272 |
| | | | | 725/32 |
| 2006/0135235 | A1 * | 6/2006 | Willis | A63F 13/12 |
| | | | | 463/1 |
| 2006/0294538 | A1 * | 12/2006 | Li | H04N 7/17318 |
| | | | | 725/24 |
| 2007/0044140 | A1 * | 2/2007 | Ogushi | G06F 21/629 |
| | | | | 726/2 |
| 2007/0050382 | A1 | 3/2007 | Bugir et al. | |
| 2007/0113184 | A1 | 5/2007 | Haot et al. | |
| 2007/0162379 | A1 | 7/2007 | Skinner | |
| 2008/0097872 | A1 | 4/2008 | Peckover | |

* cited by examiner

PROCESS AND APPARATUS FOR ADVERTISING COMPONENT PLACEMENT

CROSS-REFERENCE TO RELATED APPLICATIONS

This application is a continuation under 35 U.S.C. § 120 of U.S. application Ser. No. 11/701,822, filed Feb. 2, 2007, published as 2008/0126226 A1 on May 29, 2008, which claims priority under 35 U.S.C. § 119 to GB Application No. 0624789.4, filed Dec. 12, 2006, and GB Application No. 0623411.6, filed Nov. 23, 2006. The entire contents of each of the above-referenced applications are hereby incorporated by reference.

BACKGROUND OF THE INVENTION

Field of the Invention

The invention relates to a process and apparatus for the placement of advertising components into content, and particularly video material.

Description of the Related Technology

It is well known to display advertisements, made of one or more graphical components before, during or after a television program or film. For example, a television program may be spliced into a plurality of segments and advertising components may be displayed in between spliced segments, before the television program and after the television program. However, the splicing of a program into segments deteriorates a consumers viewing pleasure when watching the program. Accordingly, this type of intrusive placement of advertising components is not popular with consumers. In addition, the introduction of digital television set-top boxes, such as Sky Plus from BSkyB, means that a consumer can skip or fast forward advertising components. This reduces the amount of revenue generated by the placement of advertising components.

It is also known to place advertising components strategically within a shot when recording a television program or film. For example, as illustrated in FIG. 1, Coca Cola™ glasses are positioned on a table within a shot. This type of advertising is more acceptable to the consumer. However, due to an increasingly global market where television programs and films are shown around the world, this type of advertising has limitations. For example, an advertiser may only have paid to advertise their product in one country, or brands may differ between countries. Furthermore, this type of advertising has to be considered prior to recording the television program or films etc.

Embodiments of the invention seek to provide improved methods, including business processes and apparatus for placing advertising components in video material such as television programs or films etc.

SUMMARY

According to another aspect of the present invention, there is provided a method preparing video material for distribution comprising providing a repository of video material;

analyzing video material to define placement zones for placement of digital advertising components;

electronically placing one or more digital advertising components in video material; and outputting video material for distribution.

Preferably, said step of electronically placing comprises digital tracking of the digital video material such that after the placing step the digital advertising components is integrated within the format of the digital video material. Even more preferably, the tracking involves feature by feature tracking over a plurality of frames. For example placement may involve pixel by pixel tracking over a series of frames.

Embodiments of the invention are capable of placing a plurality of digital advertising components in different placement zones of a video material item. Likewise, the repository of video material will in practice holds many individual items of video material from various video material sources.

In certain embodiments, there is generated a market for placement zones in video material, for example by means of providing a bidding interface through which parties wishing to place advertising components can bid competitively for placement zones. Alternatively, or in addition, a valuation is placed on one or more placement zones such that it can be offered to the market at a predetermined price or at a particular reserve price.

Preferably, the repository of video material comprises video material from a plurality of different sources. In certain embodiments, video material from different sources may be in different formats. Accordingly, video material into which digital advertising components are to be placed is converted into one or more digital operating formats in which the step of placement takes place.

In one embodiment, distribution of the video material is performed via the source of the original material, such as a web site containing video content. In other embodiments, distribution of the video material may be performed alternatively or in addition via separate video distribution channels.

In some embodiments, corresponding video material which is distributed to different users or to different geographical regions or to different demographical regions carries different digital advertising components, as may be desired.

Users of digital advertising component placement facilities according to embodiments of the present invention benefit from superior choice of material and improved targeting of advertising effort, having regard to conventional methods. For example, attributes of digital consumers likely to consume certain categories of digital video content are well characterized and hence embodiments of the present invention allow advertisers to reach more relevant audiences. Another advantage is the ability to accurately measure results from such campaigns.

According to another aspect of the present invention, there is provided a method for preparing video material for distribution, comprising receiving video material from a plurality of video sources;

receiving digital advertising components;

converting the video material from said video sources into one or more operating formats suitable for receiving placement of a digital advertising component;

electronically placing the digital advertising component into the video material in an operating format such that the digital advertising component becomes integrated into said video material format; and outputting said video material for distribution.

According to another aspect of the present invention, there is provided a method of preparing digital video material from a plurality of video material sources for distribution, comprising preparing video material by processing the video material to identify suitable placement zones for receiving digital advertising components;

generating a market for one or more placement zones; and placing a digital advertising component in a particular placement zone responsive to a request from an advertiser for a particular digital advertising component to be placed in that placement zone.

Preferably, said advertiser is an advertising agency and/or a brand holder, but the term advertisers should not be so limited. Preferably, there is some desirable correlation between the digital advertising component placed and the placement zone selected for its placement and/or the video material in which the placement zone resides. In this way, advertisers and brand holders can ensure their advertising components reach relevant target audiences.

Preferably, said processing is performed electronically (i.e. without human intervention). In certain embodiments, said processing may be manual (i.e. performed with the aid of a human operator).

In some embodiments, the digital advertising component is a graphical element supplied by one or more of: an advertiser; a brand holder; and a creative services provider. In some contexts herein, the term advertiser is used to refer to all of these entities. In certain embodiments the method of preparing digital video material from a plurality of video material sources for distribution, further comprises providing a repository of video material.

According to another aspect of the present invention, there is provided a method of preparing video material for distribution, comprising preparing video material by processing the video material to identify suitable placement zones for receiving digital advertising components;

valuing individual placement zones and/or pluralities of placement zones and providing information on said valuations. to advertisers; and receiving a selection of placement zone{s} responsive to provision of said valuations.

Preferably, the step of valuation comprises receiving (or generating) one or more metrics relating to said video material. For example, a valuation of a particular placement zone may be based at least in part on one or more metrics relating to historic or anticipated future viewing statistics. Such statistics may be a function of the popularity of video material in which the placement zone resides, a function of the intended distribution channel, and/or a function of the placement zone having regard to other placement zones.

In certain embodiments the method of preparing video material for distribution, further comprises providing a repository of video material.

According to another aspect of the present invention, there is provided a method of advertising in digital video material, comprising obtaining consent from a plurality of sources of video material to place digital advertising components in video material from said sources;

receiving and aggregating video material from a plurality of sources;

preparing video material for placement of digital advertising components, including identifying and marking suitable placement zones;

receiving from an advertiser a selection from among available placement zones for a particular advertising component;

placing said particular advertising component in the relevant placement zone responsive to said selection; and outputting the video material with the digital advertising component placed within it.

Preferably, the method further includes a step of obtaining the approval of the video material owner/distributor for the combination of placed advertising component and video material.

Preferably, the method further includes a step of obtaining the approval of the advertiser for the combination of the placed advertising component and the video material.

In certain embodiments, a step of approval by one party or another triggers a charge to be applied to relevant parties. Alternatively, or in addition, payment may fall due to a placement facility from a party placing a digital advertising component on one or more of: (i) placement; and (ii) supply of the digital video material with the relevant component or components placed therein to a distributor for distribution. Alternatively, or in addition, payments may be applied based on subsequent viewing activities or subsequent click through activities.

In certain embodiments, payments may be distributed among one or more of: the parties placing the digital advertising component; the sources of video material; creative services; and distributors of the video material. Optionally, payments may be made to metrics providers and/or billing partners. In one embodiment, the placement facility shares advertising revenue with advertising agencies if advertisers place adverts through the facility.

According to another aspect of the present invention, there is provided a method of preparing digital video material for distribution, comprising providing a repository of video material;

preparing individual video material items within said repository of video material for receiving placement of a digital advertising component by defining one or more placement zones suitable for receiving such a digital advertising component;

providing a mechanism for selection of a placement zone in video material for a particular digital advertising component by an advertiser;

placing a digital advertising component responsive to a selection of an advertiser; and charging at least said advertiser based on said selection.

According to any of the methods and systems disclosed herein, the digital advertising component may comprise a dynamic link (such as a hyperlink). In such cases, a dynamic link in the form of an advertising component in the video material allows users to benefit from a further or enhanced experience associated with the advertiser, the brand or brand holder. In certain embodiments, a dynamic link connects to a facility for measuring user response to targeted advertising components.

According to another aspect of the present invention, there is provided a method of categorizing video material in a repository based at least in part on one or more of: genre; popularity; and price. According to another aspect of the present invention, categorized video material is searchable based on such categories or provided in a ranking table in order of priority according to some measure of relevance.

According to another aspect of the present invention, there is provided a method of categorizing placement zones within video material, based at least in part on one or more of: genre; popularity; and price. According to another aspect of the present invention, categorized placement zones are searchable or provided in a ranking table in order of priority according to some measure of relevance.

According to another aspect of the present invention, there is provided a method of processing video material for advertising component placement, the method comprising scanning video material suitable for advertising component placement to detect a placement zone of a minimum predetermined area and in view for a minimum predetermined period of time;

inserting a place-holder in the placement zone; and saving the video material with the place-holder to storage means.

According to another aspect of the present invention, there is provided a method of operating a computer for processing video material for advertising component placement, the method comprising providing a video material processor for scanning video material suitable for advertising component placement to detect a placement zone of a minimum predetermined area and in view for a minimum predetermined period of time;

causing the video material processor to insert a place-holder in the placement zone; and saving in storage means the video material with the place holder.

According to another aspect of the present invention, there is provided a method as detailed above, further comprising allocating the scanned video material to at least one category of video material.

According to another aspect of the present invention, there is provided a method as detailed above, wherein the step of allocating the scanned video material to at least one category is performed prior to scanning the video material.

According to another aspect of the present invention, there is provided a method as detailed above, wherein the step of allocating the scanned video material to at least one category is performed after the video material is saved in the storage device.

According to another aspect of the present invention, there is provided a method as detailed above, further comprising inserting the scanned video material in a category of a video material catalog.

According to another aspect of the present invention, there is provided a method as detailed above, further comprising inserting the scanned video material in a video material inventory.

According to another aspect of the present invention, there is provided a method as detailed above, wherein the step of inserting the scanned video material in a video material inventory is performed prior to scanning the video material.

In certain embodiments, the step of inserting the scanned video material in a video material inventory is performed after the video material is saved in the storage device.

According to another aspect of the present invention, there is provided a method as detailed above, wherein the video material catalog comprises video material data associated with scanned video material.

According to another aspect of the present invention, there is provided a method as detailed above, wherein the video material data comprises duration of the video material and/or date of creation of the video material.

According to another aspect of the present invention, there is provided a method as detailed above, wherein the category comprises genre of video material, type of video material and/or content of video material.

According to another aspect of the present invention, there is provided a method as detailed above, further comprising obtaining video material statistics about the video material from a video material statistics provider; and associating the video material statistics with the video material.

According to another aspect of the present invention, there is provided a method as detailed above, further comprising inserting the video material in a video material league table, wherein the video material statistics are used to determine a position of the video material in the video material league table.

According to another aspect of the present invention, there is provided a method as detailed above, further comprising retrieving video material from its current location prior to scanning the video material; and returning the video material to its current location following processing of the video material.

According to another aspect of the present invention, there is provided a method as detailed above, further comprising obtaining consumer viewing data from a consumer viewing data provider.

According to another aspect of the present invention, there is provided a method as detailed above, wherein the consumer viewing data comprises a consumer viewer's age, a consumer viewer's sex, and/or a consumer viewer's occupation.

According to another aspect of the present invention, there is provided a method as detailed above, wherein the step of obtaining consumer viewing data is performed prior to scanning the video material.

According to another aspect of the present invention, there is provided a method as detailed above, wherein the step of obtaining consumer viewing data is performed after saving the video material.

According to another aspect of the present invention, there is provided a method of inserting an advertising component in video material, the method comprising selecting video material suitable for insertion of an advertising component; and inserting an advertising component into a place-holder within the selected video material, wherein the place-holder marks an area of the selected video material which is predetermined as suitable for the insertion of an advertising component.

According to another aspect of the present invention, there is provided a method as detailed above, further comprising receiving instructions to manipulate the advertising component; and processing the advertising component by applying the received manipulation instructions to produce an integrated video material and advertising component.

According to another aspect of the present invention, there is provided a method as detailed above, wherein the manipulation instructions comprise resizing, rotating, altering color, altering opacity, reducing red eye, adding blurring shadows and reflections, altering light or altering grain size.

According to another aspect of the present invention, there is provided a method as detailed above, wherein the advertising component is a static advertising component.

According to another aspect of the present invention, there is provided a method as detailed above, wherein the advertising component is a dynamic advertising component.

According to another aspect of the present invention, there is provided a method as detailed above, wherein the advertising component provides a link to an advertiser's website or web page.

According to another aspect of the present invention, there is provided method as detailed above, further comprising displaying the selected video material and inserted advertising component for approval.

According to another aspect of the present invention, there is provided a method as detailed above, further comprising inserting a second advertising component into a second place-holder within the selected video material.

According to another aspect of the present invention, there is provided a method as detailed above, wherein a first advertising component is inserted into the selected video material for a first region and a second advertising component is inserted into the selected video material for a second region different from the first region.

According to another aspect of the present invention, there is provided a method as detailed above, wherein a region comprises a country, a state, a county or a group of countries.

According to another aspect of the present invention, there is provided a method as detailed above, wherein a first advertising component is inserted into the selected video material when it is determined that a viewing consumer is a first viewing consumer and a second advertising component is inserted into the selected video material when it is determined that the viewing consumer is a second viewing consumer, the first viewing consumer being of a different consumer group to the first viewing consumer.

According to another aspect of the present invention, there is provided a method as detailed above, wherein the first viewing consumer is a male and the second viewing consumer is a female.

According to another aspect of the present invention, there is provided a method as detailed above, wherein the video material is displayed in a video material inventory comprising at least one video material.

According to another aspect of the present invention, there is provided a method as detailed above, wherein the video material is displayed in a category of a video material catalog comprising at least one video material.

According to another aspect of the present invention, there is provided a method as detailed above, further comprising retrieving the video material from a storage device prior to insertion of the advertising component.

According to another aspect of the present invention, there is provided a method as detailed above, further comprising returning video material to the storage device after insertion of the advertising component.

According to another aspect of the present invention, there is provided a method as detailed above, wherein the advertising component is uploaded from a user's computer.

According to another aspect of the present invention, there is provided a method of operating a computer for inserting an advertising component in a video material, the method comprising selecting video material suitable for insertion of an advertising component; and receiving at a video material processor instructions to insert an advertising component into a place-holder within the selected video material, wherein the place-holder marks an area of the selected video material which is predetermined as suitable for the insertion of an advertising component.

According to other aspects of the invention, there are provided computer apparatus and computer program products arranged to perform the above methods. According to further aspects, the invention provides software comprising program code to cause performance of steps in the above-defined methods. Preferably, said software is recorded on a carrier or carriers.

According to another aspect of the present invention, there is provided a computer apparatus comprising an ingest module operable to interface at least one video material source and to receive digital video material from said source;

a grooming module operable to analyze ingested video material to identify and mark one or more placement zones in said video material which is suitable for receiving a digital advertising component;

a placement module capable of placing a digital advertising component into a marked placement zone within said video material; and an export module interfacing one or more video material distributors and capable of exporting video material with digital advertising components placed therein for distribution in a distribution format.

Preferably, said computer apparatus further comprises an approval module interfacing one or more of an advertiser; a video material source; and a video material distributor.

Preferably, one or more of said ingest module, said grooming module, and said placement module is capable of detecting formats of the digital video material and, where appropriate, converting received video material into an operating format in which digital graphical advertising components can be placed into said video material electronically. In certain embodiments, a plurality of operating formats are supported.

Preferably, one or more of said placement module, said approval module, and said export module is capable of converting video material with digital advertising components placed therein into one or more predetermined distribution formats.

Preferably, said computer apparatus comprises a metrics module for generating and/or receiving valuation information about video material. Alternatively, or in addition, said computer system may comprise a billing module arranged to charge an advertiser which successfully places a digital advertising component in a placement zone offered by the computer apparatus.

According to another embodiment of the present invention, a grooming module comprises software having code for tracking candidate placement zones frame by frame to determine the placement zone has sufficient area and/or duration. Preferably, said tracking is performed automatically by the software.

According to embodiments of the present invention, a placement module comprises software having code for placing digital graphical components into digital video material in a predetermined digital video operating format. Preferably, said software integrates said digital graphical component with said digital video material by causing the placed component to track the digital video image information frame by frame. In certain embodiments, the placed advertising component exhibits visual attributes of the placement zone as the sequence of frames progresses.

According to another aspect of the present invention, each placement zone is defined in terms of one or more pixel of a frame in the video material. Preferably, said placement zone is marked by an appropriate placeholder. The place holder may take any suitable form.

In certain embodiments, the digital advertising component and the placement zone of the digital video material containing the placeholder are combined before being transmitted, for example over a network for distribution. In other embodiments, the digital advertising component and the digital video material containing the placeholder selected for receiving said digital advertising component are transmitted separately, for example over a distribution network, and recombined at a location remote from the placement location. For example, in such cases placement comprises associating a digital advertising component with the relevant placement zone placeholder, and separately sending these components to a remote location for combination. The remote location for combination may comprise an electronic device at the consumer premises or perhaps a device at a distribution node between the placement location and the consumer premises.

According to another aspect of the present invention, there is provided a computer system with some or all of the above components, having the capability of "near-live" distribution of video material, and wherein one or more of the following aspects relating to a placement zone has been agreed in advance: quality; visibility; duration; and nature of host video material.

According to another aspect of the present invention, there is provided a computer system with some or all of the above components, and further supporting the insertion of digital advertising components with dynamic linking capability.

In general, the digital advertising component may be considered to be a brand (registered as a trademark or otherwise). However, in certain embodiments, the digital advertising component may be something else, e.g. a banner or a tower advertisement.

According to another aspect of the invention, there is provided a method of providing video material with one or more integrated advertising components, comprising receiving digital video material and a digital advertising component for placement therein;

preparing the video material by determining a placement zone for said advertising component within said video material and associating said advertising component with the placement zone; and sending the prepared video material and the associated advertising component to a remote combining module operable to combine the prepared video material and the advertising component by integrating said advertising component into said placement zone before distribution of said video material.

According to another aspect of the invention, there is provided a method of providing video material with one or more integrated advertising components, comprising receiving prepared digital video material, said prepared digital video material comprising video material in an operating format and having defined within it at least one placement zone for receiving a digital advertising component;

receiving a digital advertising component with an indication associating it with a particular placement zone in prepared digital video material;

combining the prepared digital video material with the digital advertising component by integrating said advertising component into the particular placement zone within said video material; and outputting said video material for distribution.

According to certain embodiments of the above methods, a plurality of digital advertising components are supplied in association with a particular placement zone of the video material, and different advertising component-placement zone combinations are implemented in respect of alternative distribution channels and/or different consumers or consumer groups.

In one embodiment, digital advertising components are placed in particular placement zones of video material based on profiles of individual consumers. Such profiles can be determined where consumers use devices which require them to log on or similar.

According to embodiments of the present invention, video material may be comprised of back-cataloged video material, near-live broadcast material, and internet content, including user generated video content.

BRIEF DESCRIPTION OF THE DRAWINGS

For a better understanding of the invention and as to how the same may be carried into effect reference will now be made, by way of example only, to the accompanying drawings, in which.

DETAILED DESCRIPTION OF CERTAIN INVENTIVE EMBODIMENTS

Additional advantages and novel features of the invention will be set forth in part in the description which follows, and in part will become apparent to those skilled in the art upon examination of the following and accompanying drawings or may be learned by practice of the invention.

The internet is becoming increasingly dominant in society due to its large and varied content. The internet comprises a plurality of types of video material such as, for example films, television programs, sport events, or music events, which originate from, for example, film studios, broadcasters, and production companies, and so called user-generated video clips, which originate from non-professional providers. The number of user-generated video clips available on the internet is increasing as a result of the increased number of video cameras and recording devices, such as mobile telephones, having image and sound recording functions. These user-generated video clips have been known to reach a vast and diverse audience as a result of new modes of distribution including, but not limited to, video-based websites and user groups, such as www.youtube.com (recently acquired by google), IPTV, and as a result of being emailed as attachments to multiple users, and can reach a "viral" status relatively quickly.

Embodiments of the invention aim to utilize the vast reservoir of video material available on the internet, for advertising purposes.

Video material, may be audio visual material. Herein the term video material refers to moving images, and includes without limitation audio visual moving images material as well as visual moving images alone. The term video material is intended for internet or web based consumption, as well as material for distribution on traditional broadcast media.

Figure 1:
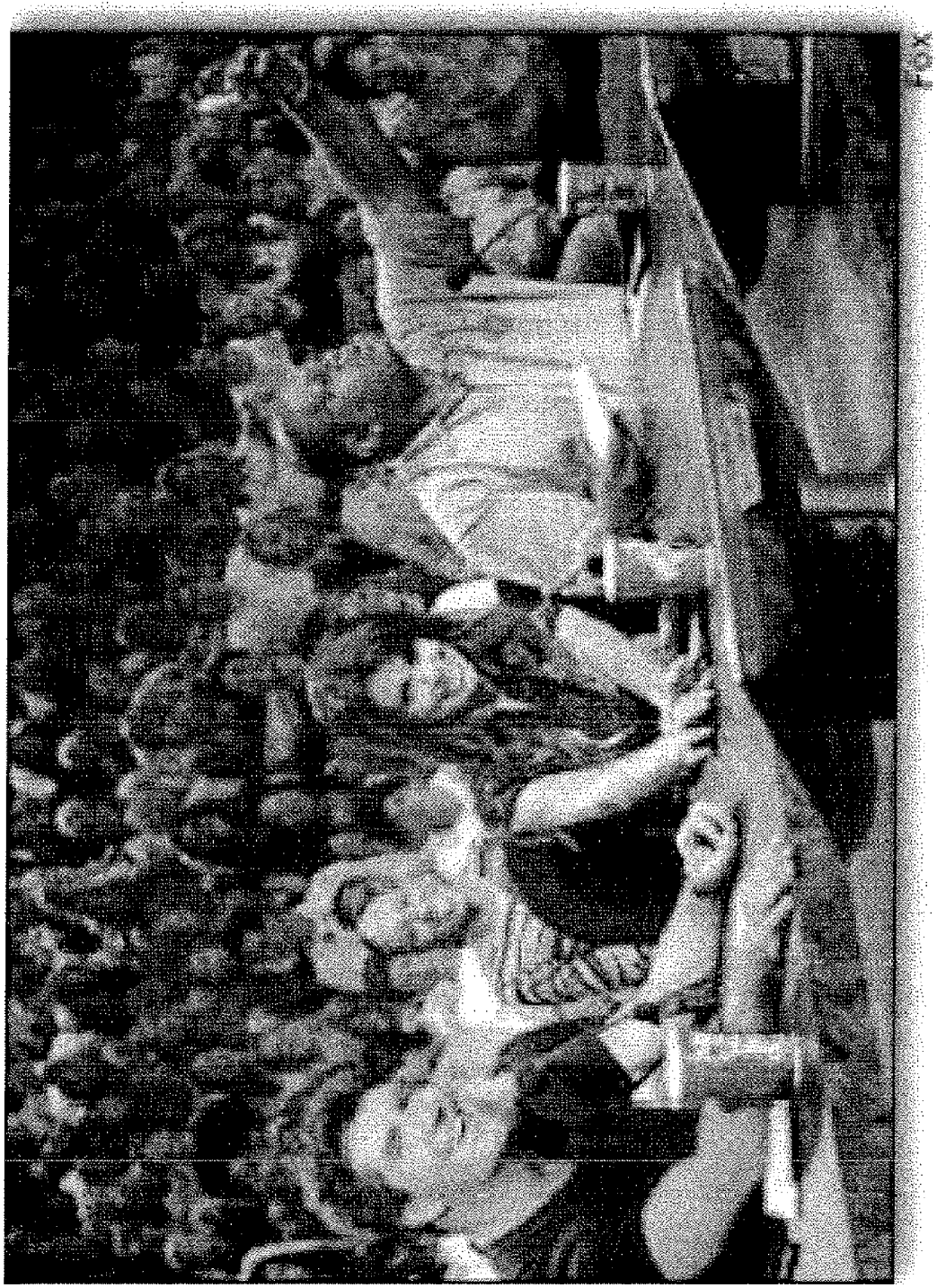
FIG. 1 illustrates the placement of Coca Cola™ glasses on a table during the recording of a television program.
Figure 2:
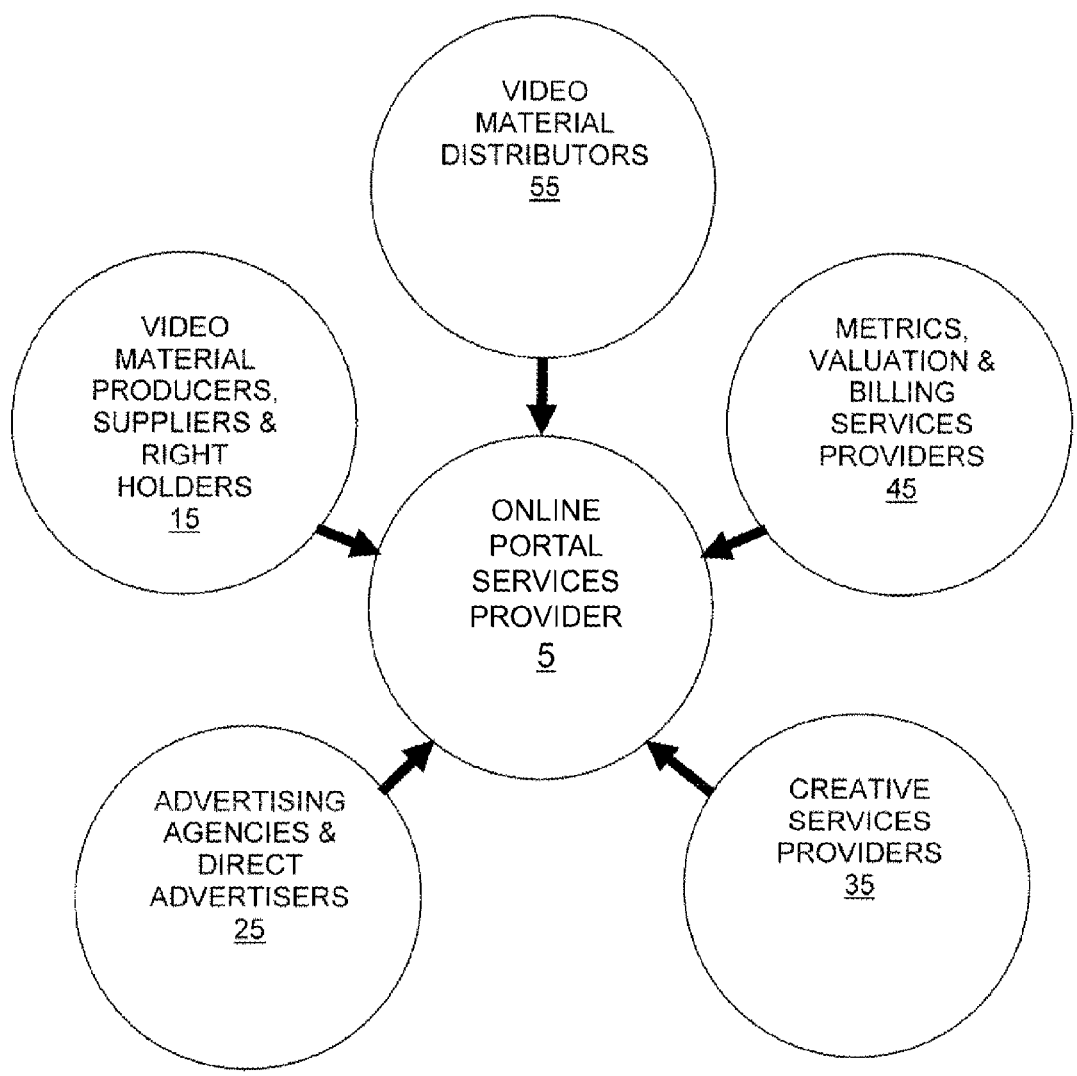
FIG. 2 illustrates a plurality of different users and providers which can be brought together by a process of the invention.

FIG. 2 illustrates a plurality of different users and providers which can be brought together by embodiments of the invention in order to utilize video material for advertising purposes.

AdBroker 5 is an advertising services provider. As illustrated in FIG. 2, the AdBroker services provider 5 can interface with a plurality of different users and providers in order to create an advanced advertising service. The service providers/users which may interface with the AdBroker services provider 5 are: video sources, such as material producers, suppliers and right holders 15; advertiser, such as advertising agencies and direct advertisers 25; creative services providers 35; content analyzers, such as, metrics, valuation and billing services providers 45; and video material distributors 55.

The AdBroker services provider 5 is capable of interfacing with at least one and preferably a plurality of different video material producers, suppliers and right holders 15. The video material producers, suppliers and right holders 15 are producers and/or suppliers of video material, such as films, television programs, sport events, music events and/or user-generated video clips. The video material may have created using any one of a plurality of different software programs and may be suitable for display on any one of a plurality of different electronic devices, such as personal computers, digital television set-top boxes, mobile telephones, personal digital assistances (PDA's), gaming systems and/or MP3 players. Consequently, the AdBroker service provider 5 is capable of utilizing video material of any one of a plurality of different formats.

Furthermore, the video material producers, suppliers and right holders 15 must have the authority to consent to the use of the video material by the AdBroker services provider 5 with advertising components. If video material producers, suppliers and right holders 15 do not have the authority to consent to the use of video material by the AdBroker services provider 5 with advertising components, then the AdBroker services provider 5 will not interface with that video material producer, supplier and right holder 15 regarding that video material.

The AdBroker service provider 5 is also capable of interfacing with at least one and preferably a plurality of different advertising agencies and direct advertisers 25. The advertising agencies and direct advertisers 25 can be any advertising agencies or direct advertisers who wish to place an advertising component in video material.

The AdBroker services provider 5 is also capable of interfacing with at least one and preferably a plurality of different creative services providers 35. The creative services providers 35 may provide services such as the design and creation of advertising components for the advertising agencies and direct advertisers 25.

The AdBroker services provider 5 is also capable of interfacing with at least one metrics, valuation and billing services provider 45. The metrics, valuation and billing provider 45 is capable of providing metrics data indicating, for example, which video material is predicted to be the most watched, by whom and how many users have viewed each video material to date. This and similar data can be used in order to determine the price for placing an advertising component in a particular video material, such that the video material which is viewed the most is the most expensive. Furthermore, the metrics data can be used to determine the amount payable to the AdBroker services provider 5 by the advertising agencies and direct advertisers 25. For example, advertising agencies and direct advertisers 25 may make a payment in respect of how many people have viewed the video material comprising their advertising component. Therefore, the metric data can be used to determine how many people have viewed the video material since the advertising component was inserted and consequently how much is payable to the AdBroker services provider 5.

The AdBroker services provider is also capable of interfacing with at least one and preferably a plurality of different video material distributors 55. The video material distributors 55 distribute the video material once relevant advertising components have been placed in the video material. The video material distributors, may distribute the video material to a plurality of electronic devices of the same or different types, such that the video material may be distributed in a plurality of different formats, each format suitable for viewing on a different type of electronic device.

The AdBroker services provider interfaces with some or all of the above mentioned components 15 to 55 in order to perform all the tasks which are involved in the successful placement of advertising components in video material and distributing the video material.

Figure 3:
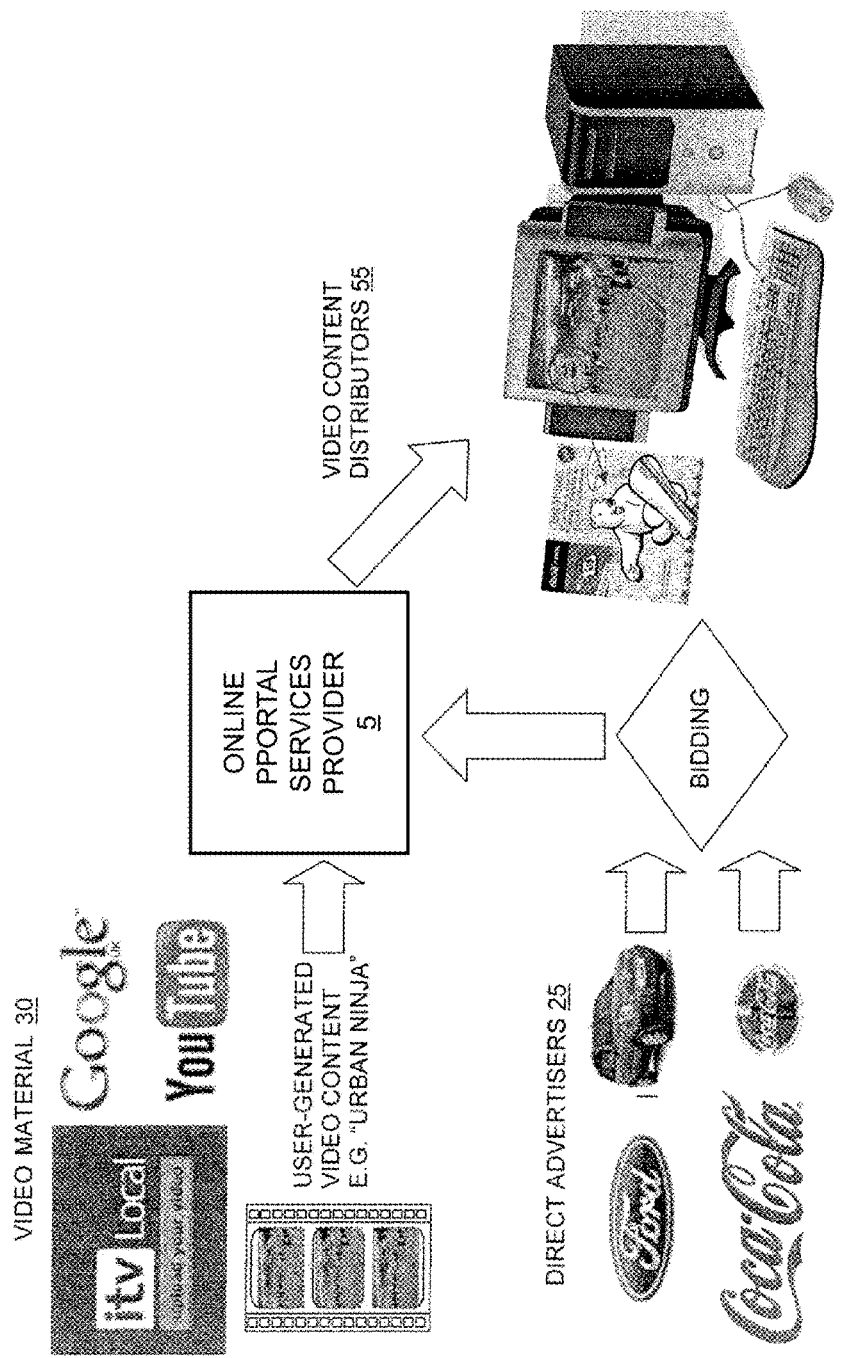
FIG. 3 illustrates one embodiment of the invention where direct advertisers place bids in order to insert an advertising component in user-generated video material.

FIG. 3 illustrates one embodiment of the invention where direct advertisers 25, with authority to use brands such as Ford™ and Coca Cola™ place "bids" in order to insert an advertising component in the user-generated video material "Urban Ninja". The user-generated video material is obtained by the AdBroker services provider 5 from a video material producer, supplier and right holder 15 such as ITV Local™, Google™ or YouTube™.

In one embodiment of the invention, the insertion of an advertising component in video material is managed by an advertising salesman, such that the salesman is in contact with different advertisers in order to negotiate placement of an advertising component.

In another embodiment of the invention the AdBroker services provider 5 organizes the bidding process, for example by generating a market of placement zones, facilitating comparisons, managing bidding and acceptance processes, setting a deadline when the final bids are to be submitted, and awarding the advertising rights to the direct advertiser 25 who submitted the most desirable bid.

In FIG. 3, the direct advertiser Coca Cola™ is successful and consequently, the Coca Cola™ advertising component is inserted into the relevant zone in the "Urban Ninja" user-generated video material by the AdBroker services provider 5. The AdBroker services provider 5 then releases the "Urban Ninja" user-generated video material comprising a Coca Cola™ advertising component to a video material distributor 55, such as ITV Local™, Google™ or YouTube™. The "Urban Ninja" user-generated video material comprising a Coca Cola™ advertising component can then be viewed by a plurality of users via an electronic device, such as a personal computer as illustrated in FIG. 3.

Figure 4:
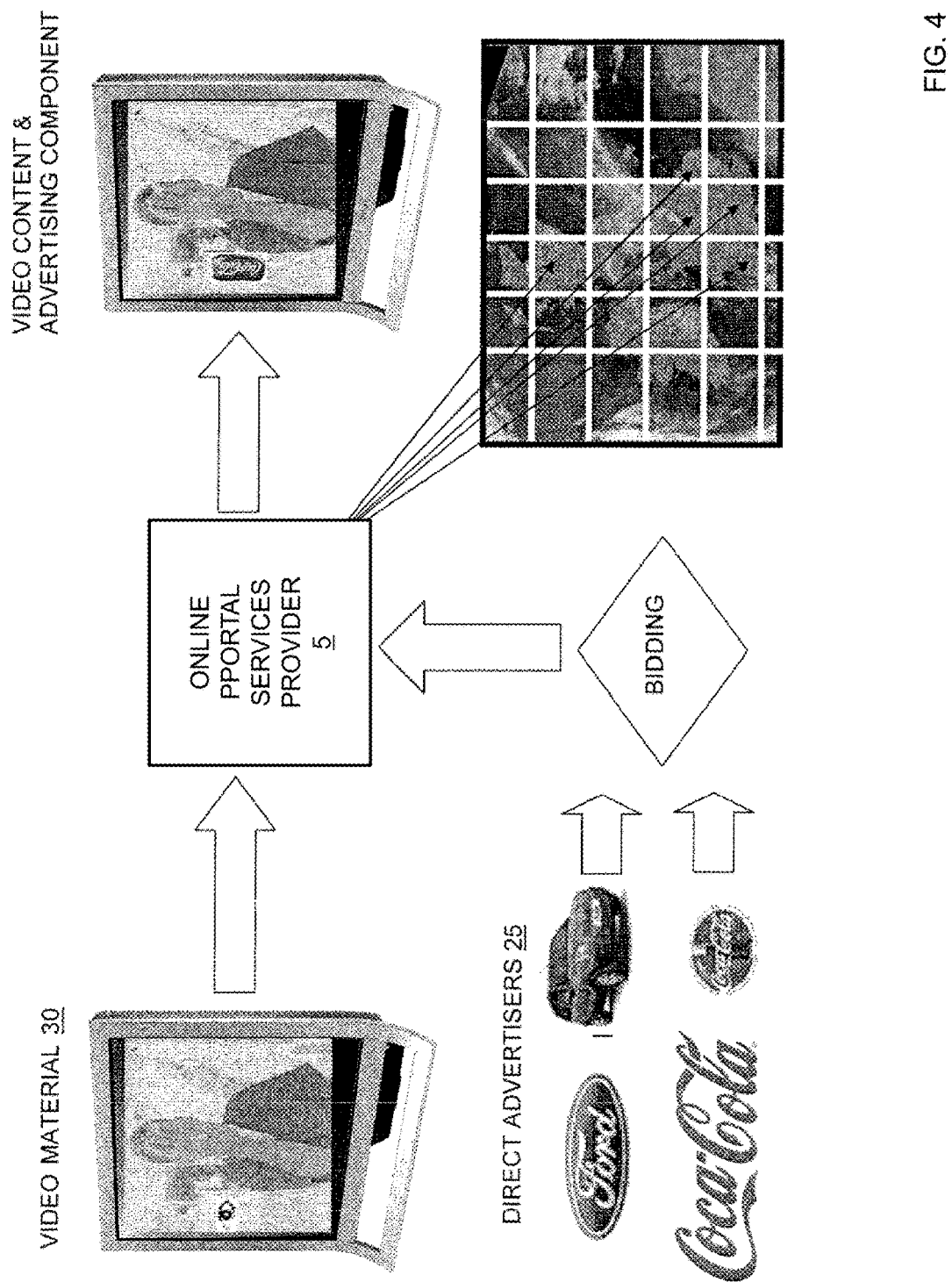
FIG. 4 illustrates another embodiment of the invention where direct advertisers place bids in order to insert an advertising component in video material.

FIG. 4 illustrates another embodiment of the invention where direct advertisers 25, such as Ford™ and Coca Cola™ place bids in order to insert an advertising component in video material, such as the television program Big Brother™. The video material is obtained by the AdBroker services provider 5 from a video material producer, supplier and right holder 15.

In one embodiment of the invention the insertion of an advertising component in video material is managed by an advertising salesman, such that the salesman is in contact with different advertisers in order to negotiate placement of an advertising component and payment for placement of the advertising component.

In another embodiment, the AdBroker services provider 5 oversees the bidding process, for example by setting a deadline when the final bids are to be submitted, and awards the advertising rights to the direct advertiser 25 who submitted the most desirable bid.

In FIG. 4, the direct advertiser Coca Cola™ is successful and consequently, the Coca Cola™ advertising component is inserted into the video material by the AdBroker services provider 5.

The Coca Cola™ advertising component is inserted into the video material by the AdBroker services provider 5 in respect of specific regions only. In the embodiment illustrated in FIG. 4 a region is an area of the United Kingdom, such as a broadcast region. However, a region may also be a specific country or a group of countries such as Europe. The AdBroker services provider 5 then releases the video material comprising the Coca Cola™ advertising component to a video material distributor 55, who distributes the video material comprising the Coca Cola™ advertising component to only the specific regions. Finally, the video material comprising the Coca Cola™ advertising component can be viewed by a plurality users, within the selected regions, via electronic devices, such as a television as illustrated in FIG. 4. Some embodiments support the placing of advertising components with active hyperlinks, through which individual users can indicate interest and through which AdBroker can measure and record interest and/or responses from individual advertising targets.

The non-selected regions in which the Coca Cola™ advertising component is not inserted may be shown without the Coca Cola™ advertising component, or a different advertising component may be inserted.

Figure 5:
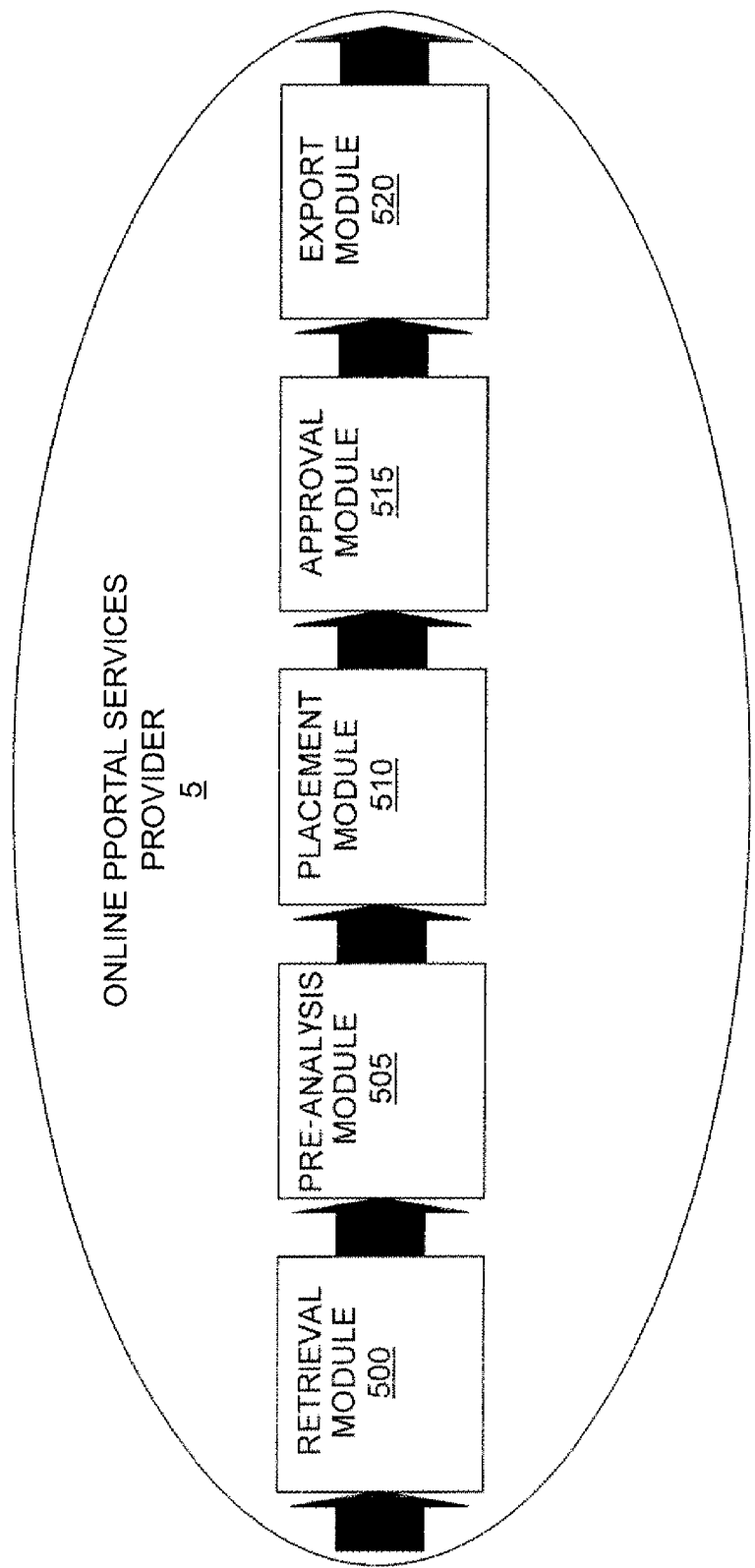
FIG. 5 illustrates an overview of a process of the invention carried out by an AdBroker services provider.

FIG. 5 illustrates an overview of the processes carried out by an AdBroker services provider 5 of the invention. As illustrated in the embodiment of FIG. 5 the AdBroker services provider 5 comprises an ingest module 500; a grooming module 505; a placement module 510; an approval module 515; and an export module 520.

The ingest module 500 is capable of interfacing with at least one and preferably a plurality of video material producers, suppliers and right holders 15. The AdBroker services provider 5 ingests video material from the plurality of video material producers, suppliers and right holder 15 which is suitable for the insertion of at least one advertising component. Prior to being ingested, it is established that the video material producer, supplier and right holder 15 of the video material is authorized to, and does authorize the use of the video material with advertising components. In some embodiments, the video material is screened at this stage to ensure the content is appropriate for distribution. Furthermore, it is established that the video material is in one of the plurality of formats which the AdBroker services provider 5 is capable of using. In preferred embodiments, the ingested content, which may be in one of many supported formats (e.g. QuickTime™, AVI™, Windows Media™, MPEG), is converted into an operating format suitable for use during the placement of the advertising components into the video material (e.g. QuickTime™).

In one embodiment of the invention, the video material is inserted into a video material inventory at the ingest stage. In a further embodiment of the invention, the video material is inserted into a video material catalog, which can be accessed and searched by the advertising agencies and direct advertisers 25.

The ingest module 500 is also capable of interfacing with the metrics, valuation and billing services provider 45. Therefore, it is possible to obtain metrics data about each ingested video material, such as the number of users viewing the video material. The video material can then be inserted into a video material league table, based on the video material metrics data. For example, the most popular video material may be placed at the top of the video material league table. In certain embodiments, there may be a plurality of league tables dealing with popularity of video material in certain categories.

The grooming module 505 prepares the ingested video material for the insertion of advertising components. The grooming module 505 scans each ingested video material in order to detect if there are any areas within the video material which can be easily tracked from frame to frame and in consequentially suitable for the placement of an advertising component. If a suitable area is detected, then a place-holder is inserted into the suitable area to mark that area as a Placement-Zone (ZoneSense™). The video material is then stored in a storage device, prior to insertion of an advertising component. Preferably grooming occurs on candidate video material items in a preferred operating format. However, where content is available in a format other than an operating format, conversion to an operating format may occur before grooming and the video material converted back to its original format after grooming.

The placement module 510 is capable of interfacing with at least one and preferably a plurality of advertising agencies and direct advertisers 25.

An advertising agency or direct advertiser 25 has access to an AdBroker services provider 5 interface for searching the video material inventory, the video material catalog and/or the video material league table in order to locate video material in which they wish to insert an advertising component. Following the identification of a video material item with a desirable placement opportunity, the advertising agency or direct advertiser 25 instructs the AdBroker services provider 5, preferably the placement module 510 of the AdBroker services provider 5, to insert an advertising component, supplied by the advertising agency or direct advertiser 25, or a creative services providers 35, into the video material, onto the place-holder, such that the advertising component is integrated with the video material in the (or each) operating format. The step of instructing may comprise a purchase act or a successful bid, and/or other such acts.

Figure 6A:
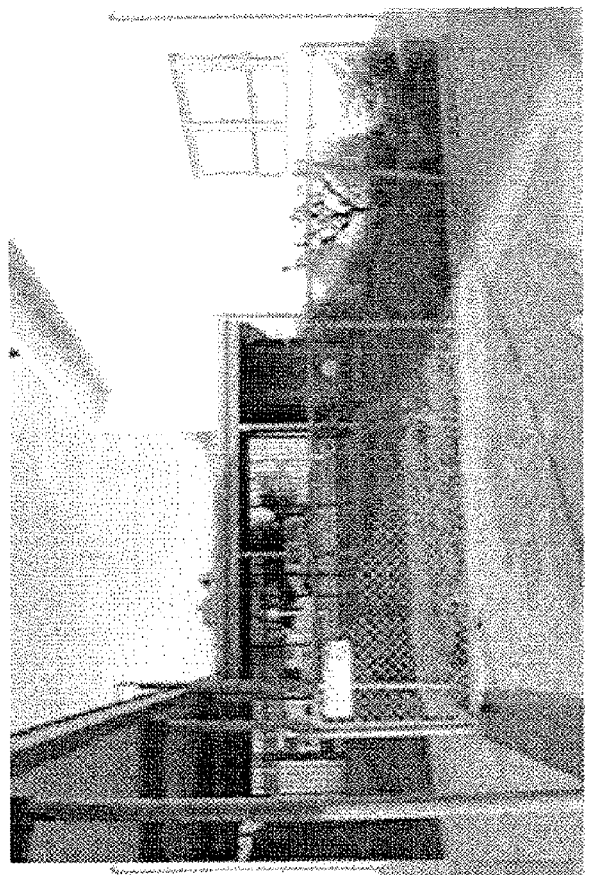
FIG. 6A illustrates video material integrated with the adverting component.
Figure 6B:
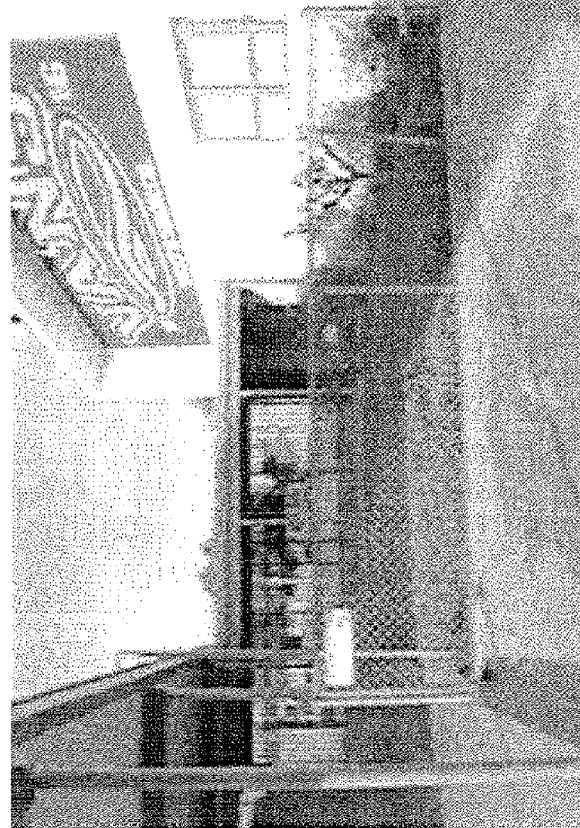
FIG. 6B illustrates video material prior to being integrated with the advertising component.

FIG. 6A illustrates an advertising component "Vans™") integrated with a video material item and FIG. 6B illustrates the video material prior to being integrated with the adverting component.

The approval module 515 is also capable of interfacing with the advertising agencies and direct advertisers 25. Following insertion of an advertising component into video material the integrated video material and advertising component can be viewed by the advertising agency or direct advertiser 25. The advertising agency or direct advertiser 25 can then either approve or reject the integrated video material and advertising component. In one embodiment, approval of the integrated video material and advertising component is also approval of the quality, appropriateness to campaign, messages and values of the integrated video material and advertising component. In another embodiment, approval of the integrated video material and advertising component is also acceptance of the tariff.

The export module 520 is capable of interfacing with at least one and preferably a plurality of video material distributors 55. The export module 520 exports the integrated video material and advertising component to at least one video material distributor 55. In one embodiment, the video material includes a film, which is to be released as a DVD, following insertion of the advertising component, the integrated video material and advertising component are exported from the export module 520 in a file format appropriate for the manufacturing process of DVD's. The video material may include a television program, which is to be viewed through IPTV, 30 following insertion of the advertising component, the integrated video material and advertising component are streamed and spliced, and exported as injected/spliced feed pre or post vision and editorial control. The video material may include user-generated video material, following insertion of the advertising component the integrated video material and advertising component are exported from the export module 520 in the correct format to a hosting facility through which the video material is viewed.

The integrated video material and advertising component can also be tagged prior to export for metrics purposes.

The AdBroker services provider 5 can be used in order to place advertising components in "near-live" broadcast such as live television programs, which are often aired with a delay, such as 10 seconds, such that the content can be monitored. In such instances placement, quality, visibility, and duration are pre-agreed with the advertiser prior to the program being aired as it is hot possible to include an approval module 515 in the process. The AdBroker services provider 5 is used in a studio/gallery environment. Furthermore, the services provider 5 can support multiple streams and delivery/export to multiple networks, electronic devices and regions.

Figure 7:
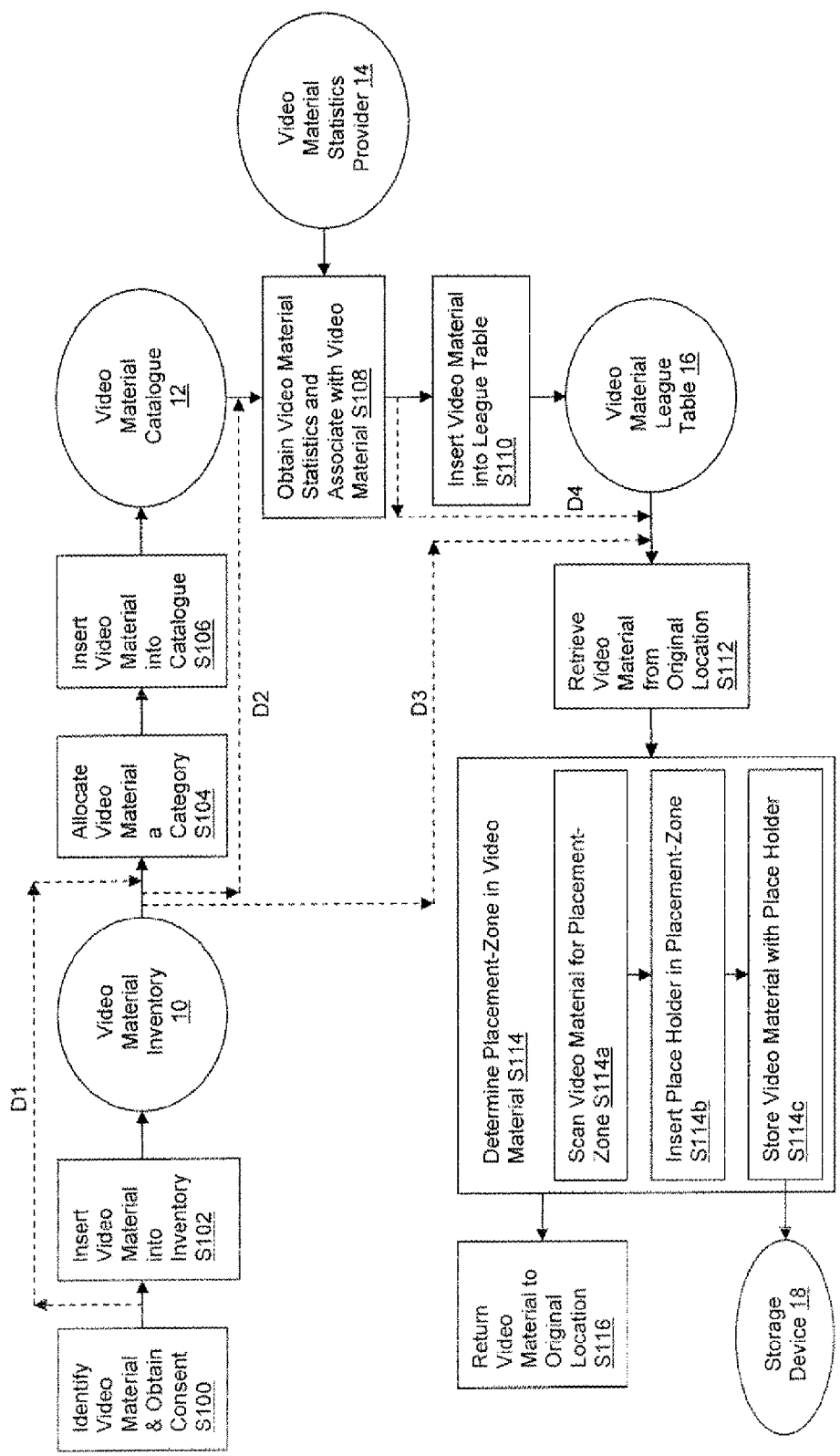
FIG. 7 illustrates a process of identifying and pre-processing a video material for the insertion of an advertising component.

FIG. 7 illustrates a process for identifying and pre-processing video material which is suitable for the placement of an advertising component. Video material may be, for example a user-generated video clip, a film, a television program, a sports event, a music event of any duration, or a static image, such as a photograph.

In step S100 video material which is considered suitable for the placement of an advertising component is identified. The step of identifying video material may be performed by any person who has the authority to determine whether the video material is suitable. For example, video material may not be considered suitable if it contains pornographic content or extremely violent content. Alternatively, the video material may not be considered suitable if its quality of reproduction is such that it does not meet certain predetermined standards. Such steps may also be performed automatically based on labels, meta-tags or the like indicating the nature and/or content of the video material.

The video material can be any video material which is currently displayed on the internet such as for example a user-generated video clip, a film, a television program or an event, of any duration. In an alternative embodiment, the producer of video material may submit the video material for consideration by the AdBroker services provider 5, rather than waiting for the video material to be identified by the process of the invention. In another embodiment; video material may be-identified prior to placement of the video material on the internet.

Once suitable video material has been identified, the producer(s)/right holder(s) of the video material must be located so that his/her authorization can be obtained for placement of an advertising component in the video material. If the producer(s) authorization is not-obtained then the video material is no longer considered suitable.

Following identification of video material at step S100, the process moves to step S102 where the video material is inserted into a video material inventory 10. The video material inventory 10 comprises a list of all identified suitable video material.

At step S104 the video material is allocated at least one category. The video material may be allocated a category based on, for example, the genre of the video material, the type of video material, or the substance of the video material. For example, if video material is considered to be humorous, then it may be allocated to the category "humorous"; if video material is a user-generated video clip, then it may be allocated to the category "user-generated video clip"; or if video material involves skate 25 boarding, then it may be allocated to the category "skate boarding". One video material may be allocated several different categories, for example a user-generated video clip featuring skate boarding may be allocated to the category "user-generated video clip" and to the category "skate boarding". Furthermore, video material may be allocated to a category and then also allocated to a sub-category of that category. For example, video material involving a humorous dog may be allocated to the category "humorous animal, and then may also be allocated to the sub-category "dogs". The above mentioned categories are described for illustrative purposes only, and the invention is not limited to the categories detailed above.

In another embodiment of the invention the video material is divided into sections and each section is assigned a different category. For example, video material may be assigned a category or sub-category summarizing the overall content, such as "humorous" or "user-generated video clip". The video material is also divided into sections and each section is assigned a different category, for example a section may be categorized based on the actor/actress featured in the section, or a section may be categorized based on the type of location, e.g. a city/countryside/beach scene.

For example, a film may be two hours long and may comprise multiple sections of video material which are suitable for the insertion of an advertising component to create integrated video material and advertising components. Therefore, one section of the film may comprise a scene involving a large building onto which an advertising component could be inserted and another section of the film may comprise a close-up of an actor wearing a T-shirt, onto which an advertising component could be inserted. In one embodiment the advertising components may originate from the different advertisers.

In another embodiment, the video material may comprise metadata, which is computed based on the video material content. The metadata can be used to support searching of a plurality of video material using queries such as "looks like . . . ."

In another embodiment of the invention, video material databases are automatically processed to produce a representation of the database that is quickly searchable. Therefore the video material is pre-processed as it is ingested. A video material databases can then be searched to find video material or a section of video material that "looks like" an image or video sample. For example, given an image or video sample with clouds or a building, an operator could search for similar video material.

At step S106, the video material is inserted into a video material catalog 12. The video material catalog 12 comprises a list of all the identified suitable video material which is available for the placement of advertising components. The video material catalog 10 is divided into categories such as genre of video material, type of video material, substance of video material. Furthermore, all the identified video material which has been allocated to the same category is grouped together under that category in the video material catalog 12. Therefore; easier for a-user to peruse the video material catalog 12 in order to locate a specific category of video material.

The video material catalog 12 may also comprise information about the video material such as the running time of the video material, the date of creation of the video material, and/or whether an advertising component has already been placed in the video material etc.

In one embodiment, the video material catalog 12 is implemented as a relational database and is accessible via the internet. The relational database can be searched using any appropriate search functions. For example, a user. of the video material catalog 12 is required to enter a search term, such as "user-generated video clip" and all the video material which has been allocated to the category "user-generated video clip" is displayed. Any aspect of the database may be searched, for example genre or subject. In a further embodiment, the search results are displayed in batches, for example only ten "user-generated video clips" may be displayed at the same time on the same web page.

In one embodiment of the invention it is not necessary to insert the identified video material into the video material inventory 10 at step S102 prior to allocating the identified video material a category. Therefore, it is possible to move directly from step S100 to step S104 as illustrated by the dotted line D1.

At step S108 video material statistics are obtained from a video material statistics provider 14 and are associated with the video material. The video material statistics comprise data about the video material such as how many people have viewed the video material in a certain period of time, or since the video material was placed on the internet. This data can be updated, for example, every 24 hours, every week or in real time. The video material statistics provider 14 is an independent provider of statistics and may be the metrics, valuation & billing services providers 45 described above.

The provided video material statistics may be associated with each identified video material such that when viewing a plurality of identified video material the statistics associated with each video material are also displayed. Therefore, a user is able to quickly determine how regularly a video material is viewed. Alternatively, or in addition, the system may include its own image statistics provider.

In one embodiment of the invention it is possible to insert video material in the video material inventory 10 at step S102, then go directly to step S108 of obtaining and associating the video material statistic data for the identified video material as illustrated by dotted line D2. In this embodiment a video material catalog 12 is not created.

With the video material statistics data the video material may be inserted into a video material league table 16 at step S110. The video material league table 16 displays at least two identified video materials ordered as a result of the associated video material statistics, such that the most viewed video material is at the top of the video material league table 16.

At step S112 the identified video material is retrieved from its current location for processing. Then at step S114 the retrieved video material is analyzed in order to determine if there is at least one Placement-Zone (ZoneSense™) in the video material. A Placement-Zone is an area within the identified video material which is suitable for the placement of an advertising component. For example, a Placement-Zone is preferably in view for at least a minimum predetermined period of time, is of at least a minimum predetermined area and is not too obscured by objects in front of it. The step of analyzing the video material in order to determine if there is a Placement-Zone can be performed by an operator, or alternatively, it may be automated.

In one embodiment of the invention, if following examination it is determined that there is no Placement-Zone in the identified video material, then the video material is no longer considered suitable. Consequently, the video material is removed from the video material inventory 10, the video material catalog 12 and/or the video material league table 16 as appropriate.

The Placement-Zone may be of any size as long as it is larger than the minimum predetermined area. In addition, the Placement-Zone may be in the foreground or the background of the video material. However, it will be apparent that larger, more prominent advertising components are of more value to a brand owner. In addition, if the Placement-Zone is in the background, then the Placement-Zone may include a traveling matte defining the visible area of the Placement-Zone. This traveling matte might be defined by masks created by an operator (e.g. by rotoscoping or painting a mask) or by automatic processing of the video material.

In order to determine if there is at least one Placement-Zone in the video material, the video material is scanned at step S114a in order to detect any area within the video material which can be tracked easily as it is in view for at least a minimum predetermined period of time and is of at least a minimum predetermined area. Following identification of at least one Placement-Zone, the video material is pre-processed for the insertion of an advertising component by the placement of a place holder in the Placement-Zone at step S114b. The place holder marks an area within the video material which is the Placement-Zone and is thus suitable for the placement of an advertising component. The video material is then stored in a storage device 18 with the place holder, such that it will be relatively easy to place an advertising component in the video material Placement- Zone at a later date. In another embodiment only the part of the video material with the Placement-Zone holder is stored in a storage device 18.

In another embodiment of the invention, the detection of at least one Placement-Zone in the video material is performed automatically. For example, in order to determine if there is a Placement-Zone in the video material, the video material is scanned to determine if there are any areas within the video material which can be tracked from frame to frame, such that it is in view for at least a minimum predetermined period of time, is of at least a minimum-predetermined area and is not too obscured by objects in front of it. This area is determined to be a Placement-Zone. The tracking can be perform automatically using known video tracking software.

Typically a Placement-Zone is first identified in a single frame of the video material, and then is tracked frame by frame through the video material in order to identify and locate the Placement-Zone as accurately as possible in each frame taking into account that the Placement-Zone in each frame may have changed its position, 15 orientation, and other geometric parameters. The appearance of the Placement-Zone may also change in each frame. For example, the Placement-Zone may be partially obscured by other objects, or there may be shadows, highlights or other illumination changes. In as many cases as possible the tracking system should recognize and locate the Placement-Zone. For example the software product Monet™, available from Imagineer Systems Ltd or similar commercially available technology, could be used to track Placement-Zones through the video material.

When at least one Placement-Zone is detected automatically, as described above, a large number of candidate Placement-Zones are created which can then be pruned either automatically or by an operator to produce a manageable number of Placement-Zones.

In one embodiment of the invention, the storage device 18 is the storage device from which the identified video material was retrieved at step S112.

Finally, at step S116 the identified video material is returned to its original location with the place holder(s) to await selection and the subsequent insertion of an advertising component.

In one embodiment of the invention, the video material is not retrieved from its original location at step S114. Instead a mirror copy of the video material is made. The mirror copy video material is then pre-processed in accordance with steps S114a to S114c described above. Following pre-processing, the mirror copy video material comprising at least one place holder is returned to the video material original location and saved over the original video material. Consequently, the video material producers, suppliers and right holders 15, upon agreeing to allow the video material to have at least one advertising component inserted, also agrees to save the pre-processed and processed video material, replacing the original video material.

In a further embodiment of the invention a tariff may also be inserted into the Placement-Zone along with the place holder, such that a user who is viewing a plurality of video material comprising Placement-Zone's is informed of the cost of inserting an advertising component into the Placement-Zone. The Placement-Zone may be marked by the insertion of a box around the Placement-Zone such that the user can clearly determine the area into which an advertising component would be inserted.

In one embodiment of the invention it is possible to insert video material in the video material inventory 10 at step S102 and then go directly to step S112 of retrieving the 25 identified video material from its original location in order to pre-process the video material, as illustrated by the dotted line D3.

In a further embodiment of the invention it is possible to move directly from step S108 of obtaining and associating video material statistic data for the video material to step S112 of retrieving the video material from its original location in order to pre-process the video material, as illustrated by the dotted line D4.

In yet another embodiment of the invention it is possible to insert video material in the video material inventory at step S102, then go directly to step S108 of obtaining and associating video material statistic data for the video material as illustrated by dotted line D2, and then moving directly to step S112 of retrieving the identified video material from its original location in order to pre-process the video material, as illustrated by the dotted line D4.

An identified video material is returned to its original location after pre-processing, but is detailed in the video material inventory 10 and/or the video material catalog 12 for selection for the insertion of an advertising component at a later time or date.

Figure 8:
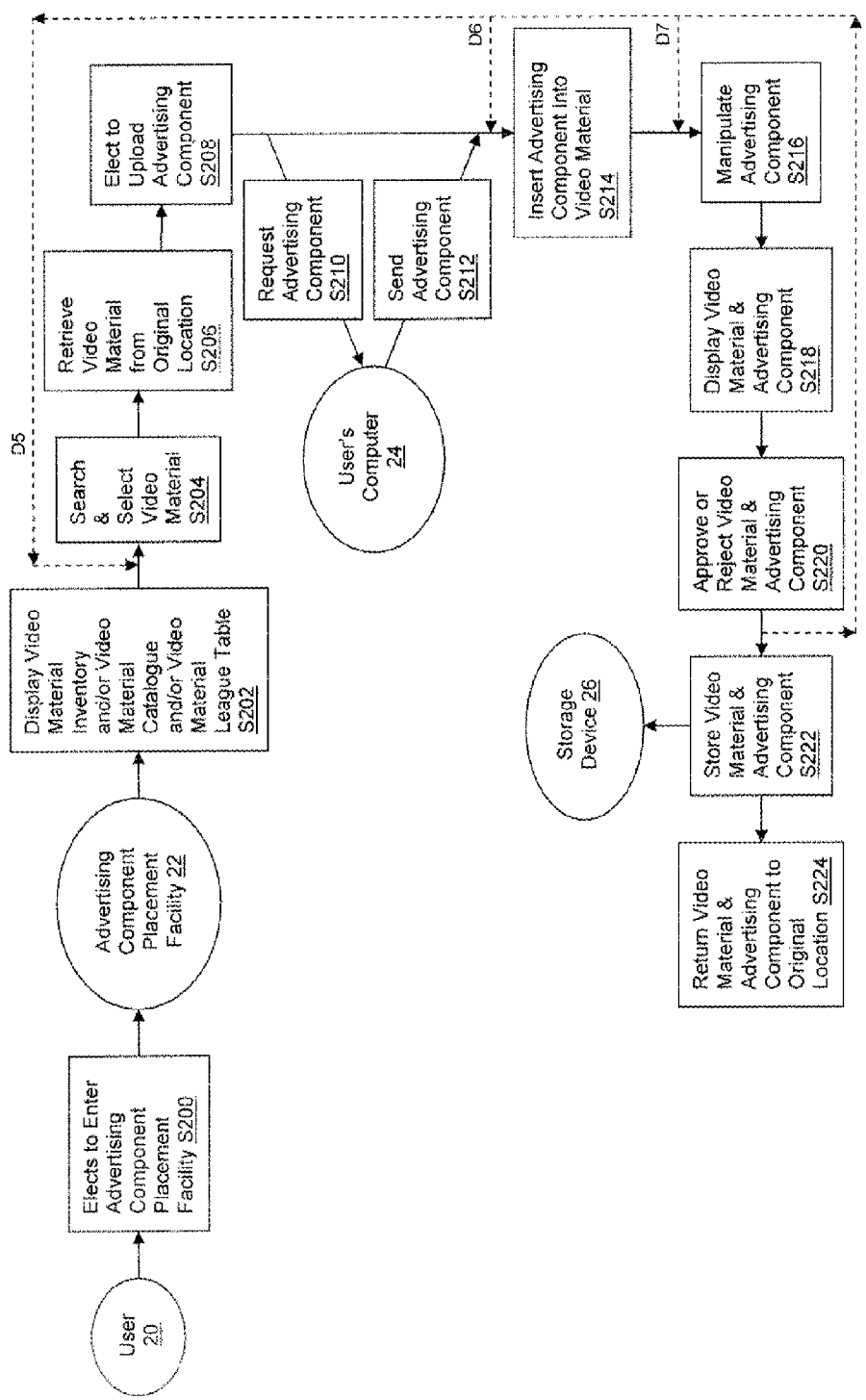
FIG. 8 illustrates a process for inserting an advertising component in a pre-processed video material.

Although the above description and FIG. 7 illustrate the video material being pre-processed after insertion into a video material inventory, a video material catalog and/or a video material league table, in another embodiment of the invention the video material is pre-processed after the video material has been identified at step S100, and before being inserted into a video material inventory, a video material catalog and/or a video material league table FIG. 8 illustrates a process for placing an advertising component in an identified video material. The video material is identified and pre-processed in accordance with a process described above with reference to FIG. 7.

A user 20 elects to enter the advertising component placement facility 22 at step S200. The advertising component placement facility 22 displays the video material inventory 10 and/or the video material catalog 12 and/or the video material league table 16, described above with reference to FIG. 7, at step S202. The user 20 can then search the video material inventory 10 and/or the video material catalog 12 and/or the video material league table 16 in order to select at least one pre-processed video material for the placement of an advertising component at step S204.

In one embodiment of the invention, the user 20 may be required to login to the advertising component placement facility 22 by entering a password. In this embodiment non-authorized users are prevented from using the advertising component placement facility 22.

Upon selection of one of the pre-processed identified video material at step S204, the advertising component placement facility 22 retrieves the selected video material from its original location at step S206, so that the video material can be processed.

An advertising component which is to be inserted into the selected video material is provided by the user 20. Therefore, the user may elect to upload the advertising component from the user's computer 24 at step S208. The user 20 requests the advertising component from the user's computer 24 at step S210 and the user's computer 24 sends the advertising component at step S212. The advertising 15 component is then inserted into the selected video material at step S214, by placement of the advertising component onto the place holder so that the advertising component is arranged in the Placement-Zone of the video material.

In another embodiment of the invention, the user may elect to upload the advertising component from a creative services provider 35.

In one embodiment of the invention, the video material is not retrieved from its original location at step S206. Instead a mirror copy of the video material comprising at least one place holder is made. The mirror copy video material is then processed 25 in accordance with steps S208 to S222 described above. Following processing, the mirror copy video material comprising at least one advertising component is returned to the video material original location and saved over the original video material.

In one embodiment of the invention the advertising component is a non-intrusive advertising component, for example the advertising component is placed on a wall, on a bus or on a t-shirt etc. within the video material. Non-intrusive advertising components may be either static or dynamic advertising components.

A static advertising component is an advertising component which is inserted into video material, to create video material with an integrated advertising component, such that wherever the video material is viewed, by whomever and whenever the advertising component will be displayed.

A dynamic advertising component is an advertising component which is inserted into video material, to create video material and integrated advertising component, "on the fly". For example, the advertising component which is integrated may be different depending on the region in which the video material is to be displayed, and/or depending on who the viewer of the advertising component is.

Figure 9A:
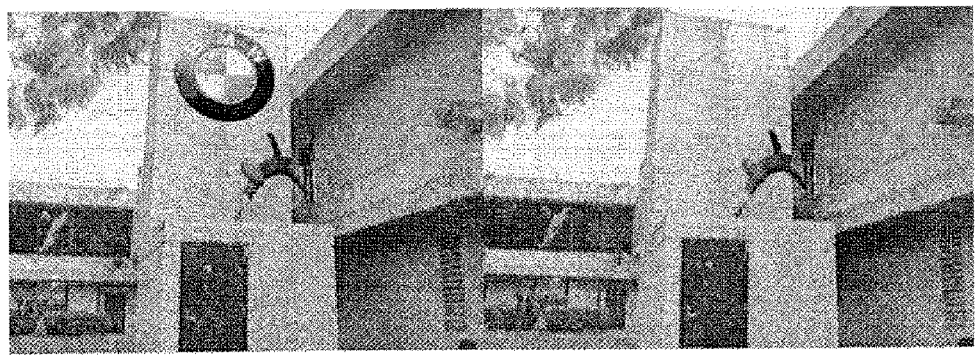
FIG. 9A illustrates a non-intrusive advertising component.

FIG. 9A illustrates a non-intrusive advertising component. The advertising component "BMW™" has been inserted into a wall within the video material The advertising component illustrated in FIG. 9A, is not animated, i.e. the advertising component is fixed and does not move within the video material. However, an advertising component may have features which move within the video material.

In addition, a static or a dynamic advertising component may provide a link to the advertiser's website or web page. When viewing the video material, a consumer can click on the advertising component. Clicking on the advertising component can either directly take the consumer to the advertisers website or web page, or can record that the consumer is interested in the product and wishes to mark the website or web page to return to following viewing of the video material. The link may also provide the consumer with a list of other similar video material which the consumer may enjoy, or similar/complementary products which the consumer may wish to purchase.

Figure 9B:
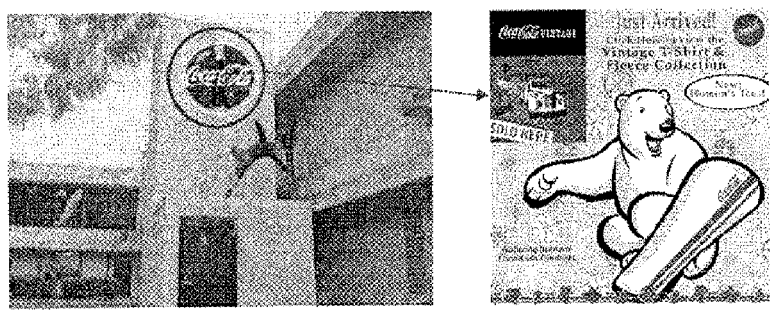
FIG. 9B illustrates a clickable link through advertising component.

FIG. 9B illustrates another non-intrusive advertising component. The advertising component "Coca Cola™" has been inserted into a wall within the video material and is a clickable hyper-link to the Coca Cola™ website.

Although the description above refers to the insertion of non-intrusive advertising components into a video material, it is also possible to apply a banner/tower advertising component to a video material using the process of the invention. A banner/tower advertising component is an advertising component which is placed at the edge of the video material, either to the side or above/below the video material, rather than inserted into the video material. A banner/tower advertising component does not require a suitable Placement-Zone to be detected within the video material.

Figure 9C:
FIG. 9C illustrates a tower advertising component placed at the side of video material.

FIG. 9C illustrates a tower advertising component placed at the side of the video material.

Alternatively, a spliced advertising component could be used in conjunction with the process of the invention. A spliced advertising component is used where video material is spliced into sections, such as scenes, and an advertising component is placed between the sections, such as conventional television advertising.

Figure 9D:
FIG. 9D illustrates a spliced advertising component placed between two sections of video material.

FIG. 9D illustrates a spliced advertising component placed between two sections of video material.

Both banner/tower advertising components and spliced advertising components can be non-intrusive, animated or clickable hyper-link advertising components as discussed above and can be used as static or dynamic advertising components.

Returning to FIG. 8, following insertion of the advertising component into the selected video material at step S214, the advertising component is then manipulated at step 8216. In one embodiment, the advertising component is manipulated such that it is the same size as the Placement-Zone. Therefore, the advertising component may need to be resized or rotated. The advertising component may also be manipulated in other ways. For example, if the video material is of a bus driving down a street and the Placement-Zone is part of the front of the bus, although the front of the bus is in view for a minimum predetermined period of time and is of at least a minimum predetermined size, the front of the bus is not completely flat and its position alters throughout the video material. Therefore, the advertising component when placed in the Placement-Zone needs to be manipulated such that it appears as if the advertising component was on the front of the bus when the video material was recorded. The advertising component is manipulated such that any reflections and/or shadows that appear on the front of the bus appears on the advertising component. In addition, the advertising component may be manipulated at step S216 such that the advertising component is blurred slightly as a result of the movement of the bus.

The aim is to create a natural look such that the advertising component blends well with the video material in which it is placed. This typically involves adding appropriate shadow, highlight and other lighting effects to the placed advertising component.

In another embodiment, shadow, highlight and other lighting effects could be used in order to emphasize the advertising component, to create a completely different look for the advertising component.

In order to manipulate the advertising component, the Placement-Zone is tracked as the video material is played, such that each pixel of the initial frame into which the advertising component is to be inserted is tracked through each frame of the video material. For example, if the top right pixel of the advertising component is inserted onto a pixel X of the video material and the pixel X of the video material moves to the left from frame to frame, the top right pixel of the advertising component will also move to the left from frame to frame when inserted, i.e. it moves with the pixel X. The resulting video material and integrated advertising component produces an image in which the advertising component is blended seamlessly into the video material and integrated into the same format.

The invention is not limited to the above mentioned manipulations and additional manipulations may also be performed on the advertising component for example the color, opacity and/or tone of the advertising component may be altered.

The advertising component can be manipulated using several different processes and software known to persons skilled in the art. For example the post processing software Monet™ could be used in order to manipulate the advertising component at step S216.

Monet™ currently supports QuickTime™ as a movie format, with the QuickTime libraries supplied by Apple™ on Mac™ and Windows™. AVI files created using a codec supported by QuickTime™ can be read by Monet™. In addition various single 10 frame formats can be read and written by Monet™, for example JPEG and TIFF. Embodiments are not limited to such formats and may in addition adopt known or future formats.

Other movie formats that can be read by Monet™ include, without limitation:
- AVI files through the use of DirectShow™ code linking to the LeadTools™ libraries licensed on Windows™;
- Raw MPEG files read by QuickTime™ and DirectShow™;
- WMV format available in the LeadTools™ libraries;
- DV (Digital Video) files supported by QuickTime™;
- 3DPP files written by QuickTime™; and
- DivX, an MPEG consumer format usually packaged into an AVI file, which can be read by QuickTime™ and DirectShow™

Video material preparation tools which can be used include, without limitation:
- Autodesk Discreet Cleaner (http://www.autodesk.com/cleaner);
- Apple Compressor, provided with Final Cut Pro and HD Studio;
- Sorensen Squeeze (http://www.sorensonmedia.com/);
- Adobe Encore (http://www.adobe.com/procluctsiencorei); and
- Microsoft.

Formats which allow for the insertion of a clickable hyperlink advertising component include, without limitation:
- RealNetworks (http://www.realnetworks.com/products/media_players.html);
- QuickTime™
- Coull Media (http://www.coull.biz/solutions/coullinteract/demonstration/player.php); and
- MPEG-4.

One advertising component can be placed into multiple video material, or several different advertising components could be inserted into different video material which are all part of the same advertising campaign. In another embodiment different advertising components can be inserted into video material of different formats, which are to be viewed using different electronic devices, such that an advertising component can be viewed on multiple different types of electronic devices.

Following insertion and manipulation of the advertising component, the selected video material is displayed having the advertising component inserted therein at step S218. The user 20 can then approve or reject the integrated video material and advertising component at step S220. In one embodiment the advertising component placement facility provider (AdBroker services provider 5) can also approve or reject the video material and advertising component. Furthermore, the producer of the video material may also be provided with an opportunity to approve or reject the integrated video material and advertising component.

If the integrated video material and advertising component is rejected by the user 20 at step S220, then the user can elect to return to step S204, step S214 or step S216 in order to reselect video material, insert the advertising component in a different Placement-Zone within the originally selected video material or re-manipulate the inserted advertising component, illustrated by the dotted line D5, D6 and D7 respectively. Alternatively, if the integrated video material and advertising component is rejected by the advertising component placement facility provider (AdBroker services provider 5) or the video material producer, the reason for its rejection is provided to the user 20, and the user 20 is ask to return to step S204, step S214 or step S216 in order to reselect video material, insert the advertising component in a different Placement-Zone within the originally selected video material or re-manipulate the inserted advertising component, illustrated by the dotted line D5, D6 and D7 respectively.

Step S220 enables the user 20 to approve the placement, quality, duration, appropriateness to campaign, message and or values etc. of the integrated video material and advertising component prior to releasing the integrated video material and advertising component.

In one embodiment the selected video material is displayed without the advertising component next to the selected video material with the inserted advertising component, as illustrated in FIGS. 6A and 6B, so that it is easy for the user 20 to compare the video material. In a further embodiment of the invention, acceptance of the video material and integrated advertising component is acceptance of not only the video material and advertising component, but also acceptance of the cost of placement of the advertising component and the acceptance of any liability. In addition, acceptance may trigger billing of the user 20.

In another embodiment of the invention, the user 20 may be presented with several different alternative integrated video material and advertising components to select from. Furthermore, approval may depend on targeting criteria and performance criteria as measured in the video material league table 16.

In one embodiment of the invention the user 20 (advertising agency and/or direct advertisers 25) makes a payment to the advertising component placement facility provider (AdBroker services provider 5) whenever an advertising component is successfully placed into video material and the video material returned to its original location. Furthermore, the user 20 may make a payment to the advertising component placement facility provider (AdBroker services provider 5) whenever the integrated video material and advertising component is viewed. In a further embodiment, if the advertising component comprises a clickable hyper-link to the advertiser's website or web page, the user 20 makes a payment to the advertising component placement facility provider (AdBroker services provider 5) every time the link is activated by a consumer. A percentage of these payments may be distributed to the video material producers, suppliers and right holder 15, the creative services provider 35, the metrics, valuation and billing services providers 45 and/or the video material distributors 55 as appropriate.

For example, in one embodiment, an advertising agency and/or direct advertiser 25 may make in initial payment to the advertising component placement facility provider (AdBroker services provider 5) for the placement of an advertising component in video material, and another payment to the advertising component placement facility provider (AdBroker services provider 5) every time the integrated video material and advertising component is viewed.

In a further embodiment, the advertising component placement facility provider 15 (AdBroker services provider 5) may receive a percentage of an advertising agencies 25 fee, if the advertising agencies 25 uses the advertising component placement facility provider (AdBroker services provider 5) to integrate video material and an advertising component.

In another embodiment, the advertising component placement facility provider (AdBroker services provider 5) may have a revenue share arrangement agreed with the video material producers, suppliers and right holder 15, the creative services provider 35, the metrics, valuation and billing services providers 45 and/or the video material distributors 55 as appropriate.

In another embodiment of the invention a bidding system exists for the most popular video material, such as the most viewed video material. Users 20 representing different advertising components can bid to insert their advertising component in the video material, and the most desirable bidder is successful.

Following acceptance of the integrated video material and advertising component at step S220, the video material and advertising component are stored in the storage device 26. In one embodiment of the invention, the storage device 26 may be the storage device from which the selected video material was retrieved at step S206. Finally, the video material and integrated advertising component are returned to the original location from which the video material was retrieved at step S206, in step S224.

The process and apparatus of the invention is capable of use with multi-format video material. Video material recorded using any one of a plurality of different software is capable of use with the system and apparatus of the invention. The video material is transcoded when retrieved form it original location at step S112 into a format which a capable of use with the system and method of the invention, as described herein before. Then, when the video material is returned to its original location, the video material is transcoded into the appropriate original format having the same tag and address as the video material had prior to it being retrieved from its original location at step S206. Furthermore upon return of the video material and integrated advertising component to the video material original location at step S224 the distributor system of the video material is notified. Alternatively, the video material and integrated advertising component may be sent to a different location for distribution.

In one embodiment of the invention it is possible to insert more than one advertising component in the same video material. For example, if there are two or more Placement-Zones in a video material, then two or more advertising components (from the same of different advertisers) may be inserted into the video material. In one embodiment an advertising component may be inserted into a Placement-Zone in the background of a video material and another advertising component may be inserted into a Placement-Zone in the foreground of the video material.

In another embodiment, an advertising component may be inserted into a video 30 material in respect of only one country or region, such as America, then a different advertising component may be inserted into the video material, in the same or a different Placement-Zone, in respect of a different country or region such as Great Britain. A region may be a subsection (state/county) of a country, such as Texas. Alternatively, a region may be a group of countries such as Europe.

If different advertising components are inserted into the same video material in respect of certain countries or regions only, then a database can be created for the video material detailing the different advertising components which are to be inserted into the video material and the countries or regions to which each different advertising component applies.

In the embodiments of the invention described above the advertising component is inserted into the Placement-Zone of the video material, manipulated and then the integrated-video material and advertising component are returned to the video materials original location. The integrated video material and advertising component can then be viewed via an electronic device such as, for example, personal computers, digital television set-top boxes, mobile telephones, personal digital assistances (PDA's), gaming systems and/or MP3 players. However, if the advertising component is a dynamic advertising component, as described above, such that the advertising component is to be inserted in respect of only a particular region/country, or if the advertising component is to be altered depending on the 20 viewing consumer (described in further detail below), it is possible to send the video material separately from the dynamic advertising component to a targeter, such as illustrated in FIG. 10A.

Figure 10A:
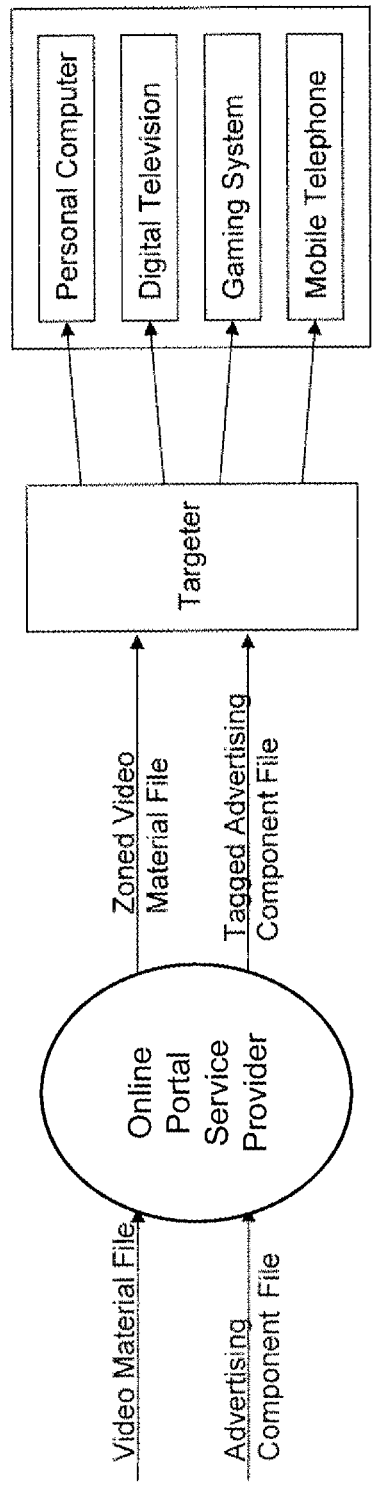
FIG. 10A illustrates an embodiment of the invention where a zoned video material file and a tagged advertising component file are sent to a video material distributor.

FIG. 10A illustrates the arrangement where a video material file and a dynamic advertising component file are input to the AdBroker services provider 5, and a zoned video material file and a tagged dynamic advertising component file are sent to a video material distributor 55 (targeter). The tagged advertising component file is a processed format of the advertising component file and includes instruction for integration of the advertising component file into the video material file, such as which Placement-Zone the advertising component is to be inserted into, and how the advertising component is to be manipulated. The zoned video material file is a processed format of the video material file and includes at least one Placement-Zone.

The targeter combines the zoned video material file and the tagged dynamic advertising component file prior to sending the integrated video material and advertising component to the correct type of electronic device. This methods of sending data streams the data such that it is bandwidth friendly. It is also advantageous if for example, the advertising component is to be changed depending on the viewing region or the viewer.

Figure 10B:
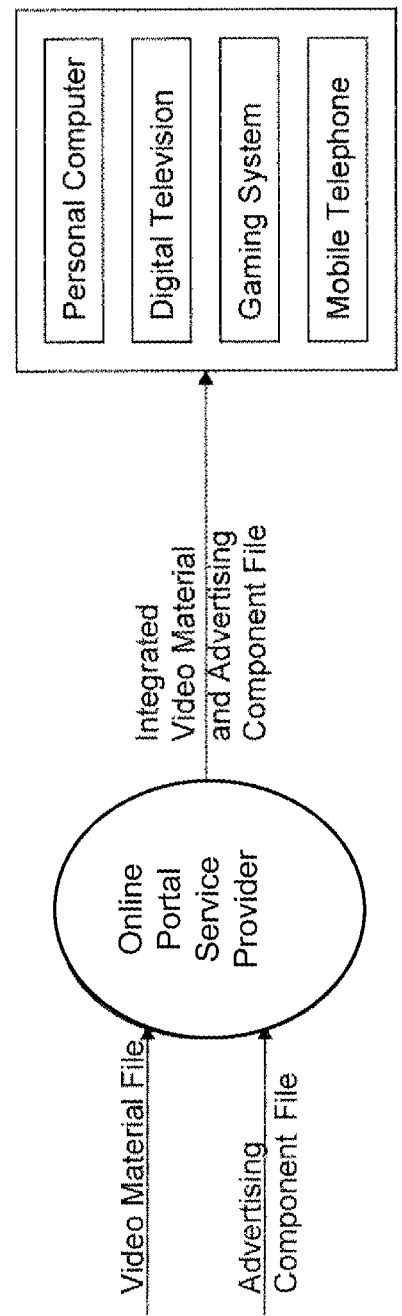
FIG. 10B illustrates an embodiment of the invention where an integrated video material and advertising component file sent to a video material distributor.

FIG. 10B illustrates an embodiment of the invention where a video material file and a static advertising component file are input to the AdBroker services provider 5. The AdBroker services provider 5 combines the video material file and the static advertising component file to create an integrated video material and advertising component file. The integrated video material and advertising component file is then sent to the electronic devices via a video material distributor 55 (not illustrated). This arrangement is not bandwidth friendly as the integrated video material file and advertising component file is larger than the separate zoned video material file and a tagged dynamic advertising component file. Furthermore, this arrangement is not live broadcast friendly as the advertising component must be inserted into the video material prior to broadcast. Furthermore, since the video material and advertising component are combined prior to distribution, multiple file versions of the integrated video material and advertising component must be sent to the broadcaster, as a different file version may be required depending on the viewing region or the viewer. Consequently multiple streams of data must be sent from the AdBroker services provider 5 to the video material distributor 55.

The process illustrated in FIGS. 7 and 8 enables advertising components to be inserted into video material, following recording of the video material. In this way advertising revenue can be generated from pre-recorded video material without deteriorating the consumers viewing pleasure by inserting spliced advertising components. Furthermore, the process illustrated in FIGS. 7 and 8 enables advertising components to be inserted into, for example, back catalogs of films or television programs.

In one embodiment of the invention the process illustrated in FIG. 7 can be modified to include a further step S300 of obtaining video material viewer data from a video material viewer data provider 28. Video material viewer data is demographic data determined about the viewers of the video material, such as the average age of the viewers.

Consumers of electronic-devices-such as, for example, personal computers digital television set-top boxes, mobile telephones, personal digital assistances (PDA's), gaming systems and/or MP3 players are in most instances required to login and/or 10 register the device. Consequently, it is possible to obtain data, such as, for example, the sex, age, and profession etc. of the consumer. This data can then be obtained from the electronic device when the consumer views video material using their electronic device.

In addition, it is possible to use the electronic devices in order to monitor which video material a consumer views, and consequently determine data about the consumer such as the genre of video material the consumer most frequently views.

Figure 11:
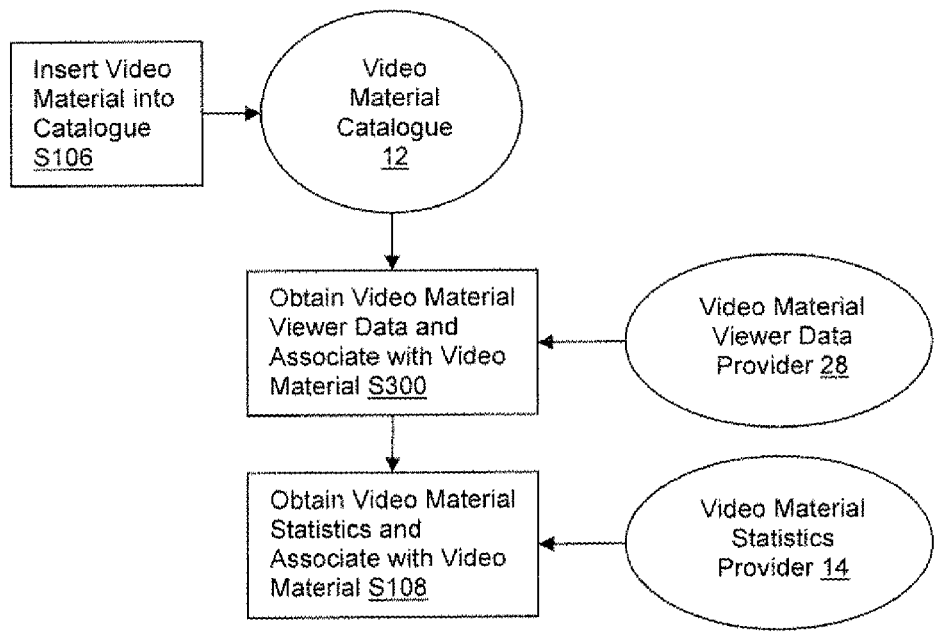
FIG. 11 illustrates a further embodiment of the process of FIG. 7.

FIG. 11 illustrates part of the process illustrated in FIG. 7 modified to include the additional step S300 of obtaining video material viewer data from a video material viewer data provider 28. The step S300 is inserted between the step S106 of inserting the video material into the video material catalog 12 and the step S108 of obtaining video material statistics data from the video material statistics provider 14.

It is also possible to insert the step S300 between the step S102 of inserting the video material into the video material inventory 10 and the step S108 of obtaining video material statistic data from the video material statistics provider 14. This arrangement can be used when a video material catalog 12 is not created, such as the arrangement illustrated by the dotted line D2.

Figure 12:
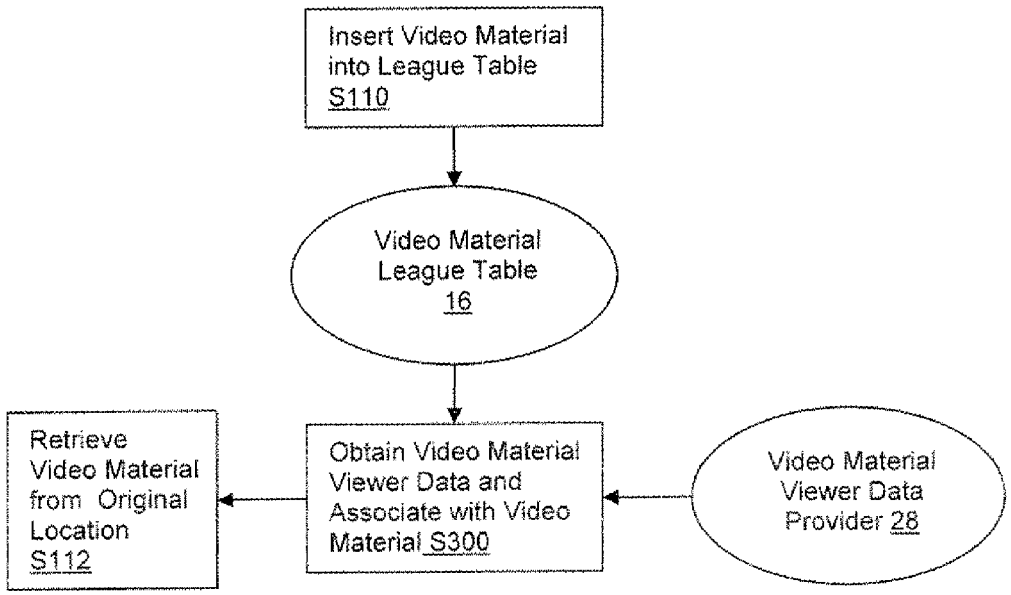
FIG. 12 illustrates a further embodiment of the process of FIG. 7.

FIG. 12 illustrates an alternative arrangement of part of the process illustrated in FIG. 7 modified to include the additional step S300 of obtaining video material viewer data from a video material viewer data provider 28. The step S300 is inserted between the step S110 of inserting the video material into the video material league table 16 and the step S112 of retrieving the video material from its original location.

Additional step S300 enhances the process of the invention as a user 20 who inserts an advertising component in video material can select the video material based on the viewer data. For example, if the user 20 is required to insert an advertising component for a brand of shaving gel, the user 20 may wish to select a video material which is viewed predominantly by men between the ages of 18 and 40. Therefore, the user 20 can review the video material viewer data in order to determine which video material(s) are viewed predominantly by men between the ages of 18 and 40, select that video material and insert the advertising component. In this way an advertising component can be inserted into a video material in order to target a specific type of consumer.

In a further embodiment of the invention it is possible for several different advertising components to be inserted into the same Placement-Zone of the same video material. For example, a video material may be equally popular with men and women of different ages. Therefore, a user 20 may insert a first advertising component into the video material such that the first advertising component will be displayed in the video material whenever it is determined from the video material viewer data that the viewer is a women. In addition, a different or the same user 20 may insert a different second advertising component into the video material such that the second advertising component will be displayed whenever it is determined from the video material viewer data that the viewer is a man. Accordingly, an advertising component can be further targeted at a specific type of consumer. In this instance the process illustrated in FIG. 10A is preferable, where a dynamic advertising component are inserted "on the fly", rather than a plurality of video material and integrated advertising components being generated, each of the plurality of video material and integrated advertising components comprising a different advertising component.

Although the above description refers to a user 20 (advertising agency or direct advertiser 25) selecting and inserting the advertising component. It is possible for the advertising component to be inserted into the video material at step S214 and manipulated at step S216 by the advert placement facility provider (the AdBroker services provider 5).

Figure 13:
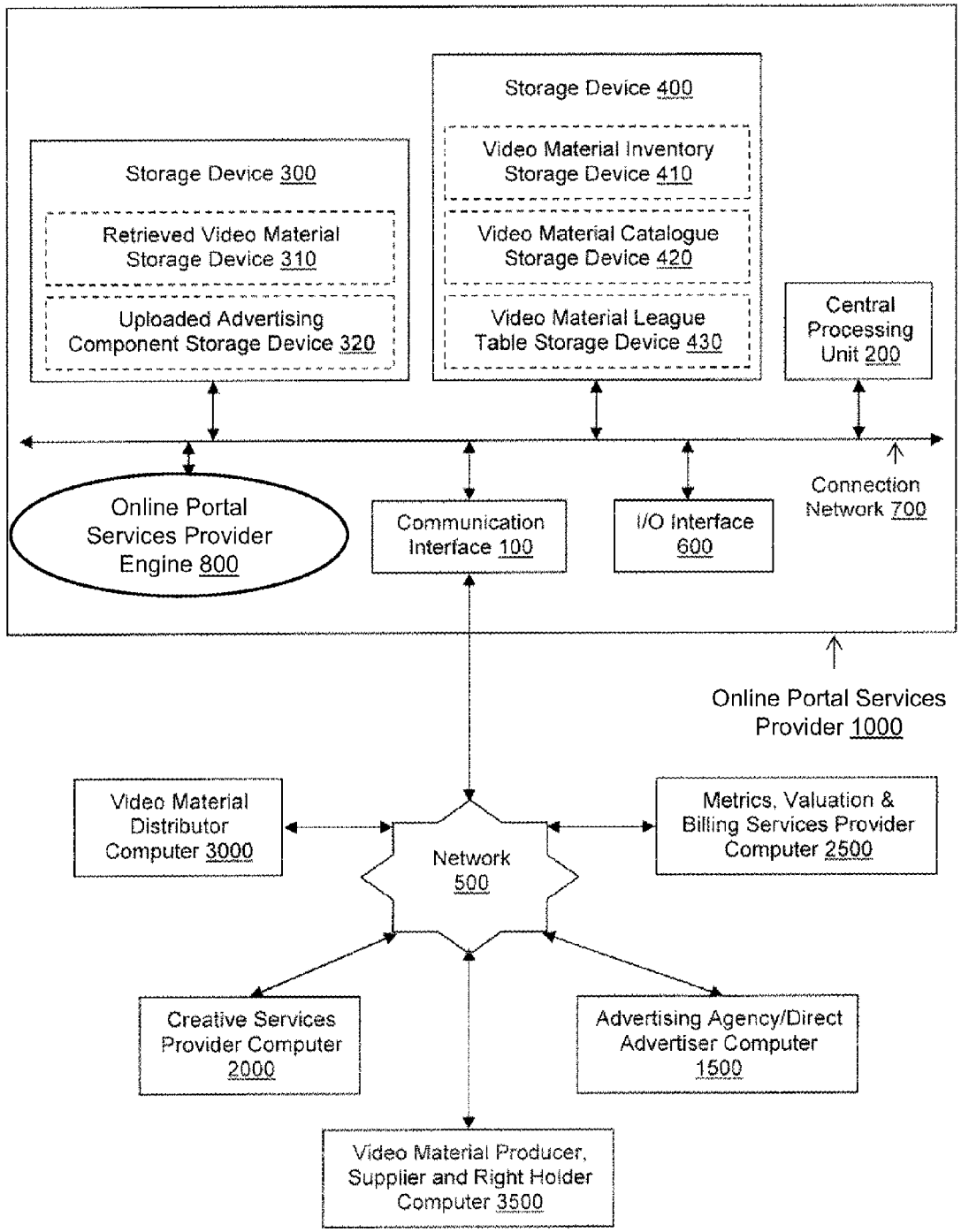
FIG. 13 illustrates a server for performing the process of the invention.

FIG. 13 illustrates an exemplary computing device 1000 such as an advertising component placement facility provider (AdBroker services provider 5) server, which is used to perform the above mentioned processes.

The computing device 1000 comprises a communication interface 100, a central processing unit 200, storage devices 300 and 400, an input/output interface 600, and an AdBroker services provider engine 800 operatively coupled by a connection network 700, illustrated in FIG. 13. The connection network 700 may be an electrical bus, an optical network, switch fabric or any other suitable interconnection system.

The AdBroker services provider server 1000 is connected over a network 500 to at least one advertising agency/direct advertiser computer 1500; at least one creative services provider computer 2000; at least one metrics, valuation and billing services provider computer 2500; at least one video material distributor computer 3000; and at least one video material producers, suppliers and right holders computer 3500. The network 500 may be for example the internet.

The central processing unit 200 controls the advertising component placement facility provider server 1000 and may be a conventional microprocessor.

The storage device 300 is a temporary storage device and comprises a retrieved video material storage device 310 and an uploaded advertising component storage 30 device 320. The storage device 400 comprises a video material inventory storage device 410, a video material catalog storage device 420, and a video material league table storage device 430. Although the storage devices 300 and 400 are illustrated as separate storage devices, one storage device may be used to store all the data. Alternatively, such devices as mentioned herein may be distributed over different servers or systems.

The temporary storage device 300 may be, for example one or more conventional random access memory (RAM) devices, Flash memory devices, and/or electrically erasable programmable read only memory (EEPROM) devices. Furthermore, although the storage device 300 is described herein as a temporary storage device, in other embodiments the storage device 300 may be a permanent storage device.

The communications interface 100 provides a bidirectional data communication coupling for the AdBroker services provider server 1000. The communication interface 100 can be functionally coupled to the network 500. In one embodiment, the communications interface 100 provides one or more input/output ports for receiving electrical, radio frequency, or optical signals and converts signals received on the port(s) to a format suitable for transmission on the connection network 700. The communications interface 100 can include a radio frequency modem and other logic associated with sending and receiving wireless or wireline communications. For example the communications interface 100 can provide an EtherNet interface, Bluetooth and/or wireless capability for the computing device 1000.

Operation of the exemplary AdBroker services provider server 1000 will now be described with reference to the process illustrated in FIG. 7.

Video material is identified as suitable in step S100 and at least a pointer to the video material is stored in the video material inventory storage device 410. In one embodiment the video material files itself is stored. As stated above the step of identifying video material may be performed by any person who has the authority to determine whether the video material is suitable. Following storage of a relevant 30 pointer or video material in the video material inventory storage device 410, the video material is allocated at least one category and is stored in the video material catalog storage device 420.

Next video material statistics are obtained from the video material statistics provider 14 (the at least one metrics, valuation and billing services provider computer 2500). The video material statistics can be associated with the video material by a person. Alternatively, the CPU 200 may associate the a relevant pointer or video material statistics with the video material stored in the video material inventory storage device 410 or the video material catalog storage device 420 in accordance with instructions from the AdBroker services provider engine 800. In one embodiment, the CPU 200 associates the correct statistics to the correct video material based on a unique identifier associated with each video material and the statistics and stores the video material in the video material league table storage device 430. The above steps can in principle be performed without necessarily bringing a version of the video material onto the system. For example, a web friendly representation of the video material or a pointer to the video material may be stored in the video material inventory storage device 410.

To process the video material a version of the video material is required to be retrieved. Consequently, the identified video material is retrieved from a relevant location, from the video material producers, suppliers and right holders computer 3500 for processing. The AdBroker services provider engine 800 instructs the CPU 200 to retrieve the video material from the relevant location via the communication interface 100 and the network 500. The retrieved selected video material is then stored in the retrieved video material storage device 310 by the CPU 200. The retrieved video material is examined by the CPU 200 in accordance with instructions from the AdBroker services provider engine 800 to determine if there is at least one Placement-Zone in the video material. The video material is scanned to locate any area within the video material which can be tracked reliably, as it is in view for at least a minimum predetermined period of time and is of at least a minimum predetermined area. Following identification of at least one Placement-Zone, a place holder generated by the CPU 200 is inserted in the detected Placement-Zone. The video material is then stored in a storage device by the CPU 200. At this point the zoned video material may be placed in the storage device 310, with a pointer to it in the (or each of) the inventory, catalog, and league table. Searchable information relating to the video material may be associated with the video material or pointer in any one of the inventory, catalog and league table. Finally, the identified video material is returned to its original location with the place-holder(s) via the communication interface 100 and the network 500.

Operation of the AdBroker services provider server 1000 will now be described with reference to the process illustrated in FIG. 8.

A user 20 (advertising agency/direct advertiser) enters the advertising component placement facility 22 at step S200. The advertising agency/direct advertiser Computer 1500 is able to communicate with the AdBroker services provider server 1000 via the network 500. The user is displayed selected contents of the video material inventory storage device 410 and/or the video material catalog storage device 420 and/or the video material league table storage device 430 as appropriate via the front end server 4000.

The user 20 selects at least one pre-processed zoned video material for the placement of an advertising component at step 8204. A signal indicating which video material has been selected is sent from the user to the AdBroker services provider server 1000. The AdBroker services provider engine 800 then instructs the CPU 200 to retrieve the selected video material from its original location and store it in the retrieved video material storage device 310. Furthermore, the user 20 uploads an advertising component from the advertising agency/direct advertiser computer 1500 or the creative services provider computer 2000 to the AdBroker services provider server 1000 via the network 500 and the communication interface 100. The AdBroker services provider engine 800 causes the uploaded advertising component to be stored in the uploaded advertising component storage device 320.

Upon instruction from the AdBroker services provider engine 800 the CPU 200 retrieves the video material from the retrieved video material storage device 310 and the advertising component from the uploaded advertising component storage device 320 and inserts the advertising component onto the place holder in the selected video material, so that the advertising component is arranged in the Placement-Zone of the video material.

Following insertion of the advertising component into the selected video material, the advertising component is then manipulated. The user manipulates the video material using known software technology which resides in the AdBroker services provider engine 800. The AdBroker services provider engine 800 instructs the CPU 100 to manipulate the advertising component. The manipulation involves the integration of the advertising component with the digital operating format of the video material by means of tracking the digital image information of the video material. This produces a video material integrated with the advertising component in the operating format. Following manipulation of the advertising component, the user is given an opportunity to view the integrated video material and advertising component via the network 500 and to approve the video material and advertising component. If the video material and advertising component is approved, the CPU 200 is instructed to store the video material and advertising component in a storage device and return the video material and advertising component to its original location for distribution via the video material distributor computer 3000.

In alternative embodiments hardwired circuitry may be used in place of or in combination with software instructions to implement aspects of the invention. Thus, embodiments of the invention are not limited to any specific combination of hardware circuitry and/or software disclosed herein.

An advantage of the process and apparatus of the invention is that an advertising component, once placed can reach a wider audience than previously achievable using conventional advertising methods. Consequently, the revenue generated by the placement of an advertising component using the process and apparatus of the invention can be increased.

Furthermore, the process and apparatus of the invention enables an advertising component to be more accurately targeted at specific consumers than previously achievable. Consequently, the revenue generated by the placement of an advertising component using the process and apparatus of the invention can be increased.

In addition, the process and apparatus of the invention enables a video material to have multiple different advertising components, such as a different advertising component for a different region or country, or different advertising component depending on who the viewing consumer is. Consequently, the same Placement-Zone can be sold multiple times, increasing the amount of revenue which can be generated by the process and apparatus of the invention.

Another advantage of the process and apparatus of the invention is that advertising components can be placed by smaller brand holders regionally as well as by larger global brand holders. Furthermore, video material which already exists can be rejuvenated to generate revenue, by the inclusion of advertising components, such as back catalogs of films and television programs.

Another advantage of the process and apparatus of the invention is that the insertion of advertising components into video material is non-intrusive and therefore does not disrupt the consumers viewing pleasure.

Those skilled in the art will appreciate that while the foregoing has described what is considered to be the best mode and, where appropriate, other modes of performing the invention, the invention should not be limited to the specific configurations and methods disclosed in this description of the preferred embodiment. Those skilled in the art will recognize that the invention has a broad range of applications in many different types of advertising, and that the embodiments may take a wide range of modifications without departing from the inventive concept as defined in the appended claims.

What is claimed is:

1. A method to provide video material with an integrated advertising component the method comprising:
receiving, at a repository, video material;
receiving an advertising component for insertion into a plurality of frames of the video material;
detecting a format of the video material and if the format of the video material is not a preferred operating format, converting the video material into the preferred operating format;
scanning the plurality of frames of the video material to identify a frame whose image content includes a placement zone suitable for receiving the advertising component, wherein
the placement zone in the frame is identified based on the placement zone having at least a minimum-predetermined area that allows for placement of the advertising component in the placement zone;
tracking the placement zone frame by frame through the plurality of frames to identify and locate the placement zone in each of the plurality of frames in which the tracking includes identifying geometric parameter changes of the placement zone that occur in the plurality of frames and in which the tracking includes identifying appearance changes in the placement zone that occur in the plurality of frames, wherein identifying the appearance changes includes:
identifying whether an object of the image content obscures at least part of the placement zone; and
identifying whether illumination of the placement zone changes;
determining, based on the geometric parameter changes and the appearance changes of the placement zone, a period of time for which the placement zone is visible in the image contents with at least the minimum-predetermined area allowing for placement of the advertising component without obscuration that exceeds a particular amount;
selecting the placement zone for placement of the advertising component based on the period of time that the placement zone is visible with at least the minimum-predetermined area allowing for placement of the advertising component to have a duration that is for at least a minimum predetermined period of time;
inserting a placeholder in the placement zone to mark an area within the image content as being suitable for receiving the advertising component in which the marked area includes the minimum-predetermined area;
generating placement instructions for the advertising component, the placement instructions comprising:
first metadata for a first set of spatial characteristics of the placement zone for a first frame of the plurality of frames and for a first set of visual effects for the advertising component;
second metadata for a second set of spatial characteristics of the placement zone for a second frame of the plurality of frames and for a second set of visual effects for
the advertising component; and
manipulation instructions for integrating the advertising component into the placement zone by manipulating one or more characteristics the advertising component such that the advertising component appears to be part of the image content of the plurality of frames, the manipulation instructions being based on the geometric parameter changes and the appearance changes of the placement zone and including a first manipulation instruction
to integrate the advertising component the placement zone as depicted in the first frame based on the first set of spatial characteristics and the first set of visual effects of the first metadata, the manipulation instructions including a second manipulation instruction
to integrate the advertising component in the placement zone as depicted in the second frame based on the second set of spatial characteristics and the second set of visual effects of the second metadata;
wherein the manipulation instructions include instructions that change an appearance of the advertising component between the frames according to the appearance changes of the placement zone in which the instructions relate to one or more of:
shadows, highlights or other lighting effects to be added to the advertising component;
color of the advertising component;
tone of the advertising component;
opacity of the advertising component; and
blurring of the advertising component;
receiving an authorization to use the video material with the advertising component from at least one of a right holder of the video material and an advertiser; and in response to receiving the authorization, transmitting at least part of the video material, the placement instructions and the advertising component over a distribution network to a remote combining module to allow the remote combining module to combine the video material and the advertising component, based on the placement instructions, wherein playback of the first frame and the second frame provides an animation of the advertising component in the video material.

2. The method according to claim 1, wherein the remote combining module comprises an electronic device located at a consumer premises.

3. The method according to claim 1, wherein the manipulation instructions are further based on a characteristic of the advertising component.

4. The method according to claim 1, wherein the manipulation instructions further include, instructions on one or more of:
tracking of the placement zone; and
resizing of the advertising component.

5. The method according to claim 1, wherein a type of the advertising component is implemented in respect of alternative distribution channels and/or different consumers.

6. The method according to claim 5, wherein the type of the advertising component is selected for placement in the placement zone based on a particular profile of an individual consumer.

7. The method according to claim 6, wherein the particular profile of the individual consumer is determined based on where the individual consumer uses devices which require the individual consumer to log on.

8. The method according to claim 1 further comprising converting the video material into one or more operating formats suitable for receiving an advertising component.

9. The method according to claim 1, wherein the placement zone is in a section of the video material and the advertising component is selected for placement in the placement zone based on a locale of the section of the video material.

10. The method according to claim 1, wherein the advertising component is selected for placement in the placement zone based on a brand category of the advertising component.

11. An apparatus to provide video material with one or more integrated advertising components, the apparatus comprising:
a memory; and
a processor operatively coupled to the memory, the processor being configured to: receive, at a repository, video material;
receive an advertising component for insertion into a plurality of frames of the video material;
detect a format of the video material and if the format of the video material is not a preferred operating format, convert the video material into a preferred operating format;
scan the plurality of frames of the video material to identify a frame whose image content includes a placement zone suitable for receiving the advertising component, wherein
the placement zone in the frame is based on the placement zone having at least a minimum-predetermined area that allows for placement of the advertising component in the placement zone;
track the identified one or more placement zones frame by frame through the plurality of frames to identify and locate the placement zone in each of the plurality of frames in which the tracking includes identifying geometric parameter changes of the placement zone that occur in the plurality of frames and in which the tracking includes identifying appearance changes in the placement zone that occur in the plurality of frames;
determine, based on the geometric parameter changes and the appearance changes of the placement zone, a period of time for which the placement zone is visible in the image contents with at least the minimum-predetermined area allowing for placement of the advertising component without obscuration that exceeds a particular amount;
select the placement zone for placement of the advertising component based on the period of time that the placement zone is visible with at least the minimum-predetermined area allowing for placement the advertising component to have a duration that is for at least a minimum predetermined period of time;
insert a placeholder in the placement zone to mark an area within the image content as being suitable for receiving the advertising component in which the marked area includes the minimum-predetermined area;
generate placement instructions for the advertising component, the placement instructions comprising:
first metadata for a first set of spatial characteristics of the placement zone for a first frame of the plurality of frames and for a first set of visual effects for the advertising component:
second metadata for a second set of spatial characteristics of the placement zone for a second frame of the plurality of frames and for a second set of visual effects for
the advertising component; and
manipulation instructions for integrating the advertising component into the placement zone such that the advertising component appears to be part of the image content of the plurality of frames zones, the manipulation instructions including a first manipulation instruction to integrate the advertising component in the placement zone as depicted in the first frame based on the first set of spatial characteristics and the first set of visual effects of the first metadata, the manipulation instructions including a second manipulation instruction to integrate the advertising component in the placement zone as depicted in the second frame based on the second set of spatial characteristics and the second set of visual effects of the second metadata;
receive an authorization to use the video material with the advertising component from at least one of a right holder of the video material and an advertiser; and
in response to receiving the authorization, transmit at least part of the video material, the placement instructions and the one or more advertising components over a distribution network to a remote combining module to allow the remote combining module to combine the video material and the one or more advertising components, based on the placement instructions, wherein playback the first frame and the second frame provides an animation of the one or more advertising components in the video material.

12. The apparatus according to claim 11, wherein the remote combining module comprises an electronic device located at a consumer premises.

13. The apparatus according to claim 11, wherein the manipulation instructions are further based on a characteristic of the advertising component.

14. The apparatus according to claim 11, wherein the manipulation instructions further include instructions on one or more of:
- tracking of the placement zone; and
- resizing of the advertising component.

15. The apparatus according to claim 11, wherein a type of the advertising component is implemented in respect of alternative distribution channels and/or different consumers.

16. The apparatus according to claim 11, wherein the manipulation instructions change an appearance of the advertising component between the frames according to the appearance changes of the placement zone.

17. The apparatus according to claim 11, wherein the manipulation instructions relate to one or more of:
- shadows, highlights or other lighting effects to be added to the advertising component;
- color of the advertising component;
- tone of the advertising component;
- opacity of the advertising component; and blurring of the advertising component.

18. The apparatus according to claim 11, wherein identifying the appearance changes includes:
- identifying whether an object of the image content obscures at least part of the placement zone; and
- identifying whether illumination of the placement zone changes.

19. A non-transitory computer-readable storage medium comprising computer-executable instructions which, when executed by a processor, cause a computing device to perform operations comprising:
- receiving, at a repository, video material;
- receiving an advertising component for insertion into a plurality of frames of the video material;
- detecting a format of the video material and if the format of the video material is not a preferred operating format, converting the video material into the preferred operating format;
- scanning the plurality of frames of the video material to identify a frame whose image content includes a placement zone suitable for receiving the advertising component, wherein
- the placement zone in the frame is identified based on the placement zone having at least a minimum-predetermined area that allows for placement of the advertising component in the placement zone;
- tracking the placement zone frame by frame through the plurality of frames to identify and locate the placement zone in each of the plurality of frames in which the tracking includes identifying geometric parameter changes of the placement zone that occur in the plurality of frames and in which the tracking includes identifying appearance changes in the placement zone that occur in the plurality of frames;
- determining a period of time for which placement zone is visible in the image contents with at least the minimum-predetermined area allowing for placement of the advertising component without obscuration that exceeds a particular amount;
- selecting the placement zone for placement of the advertising component based on the period of time that the placement zone is visible with at least the minimum-determined area allowing for placement of the advertising component to have a duration that is for at least a minimum predetermined period of time;
- inserting a placeholder in the placement zone to mark an area within the image content as being suitable for receiving the advertising component in which the marked area includes the minimum-determined area;
- generating placement instructions for the advertising component, the placement instructions comprising:
  - first metadata for a first set of spatial characteristics of the placement zone for a first frame of the plurality of frames and for a first set of visual effects for the advertising component;
  - second metadata for a second set of spatial characteristics of the placement zone for a second frame of the plurality of frames and for a second set of visual effects for the advertising component; and
  - manipulation instructions for integrating the advertising component into the placement zone by manipulating one or more characteristics of the advertising component such that the advertising component appears to be part of the image content of the plurality of frames the manipulation instructions being based on the geometric parameter changes and the appearance changes the placement zone and including a first manipulation instruction
  - to integrate the advertising component in the placement zone as depicted in the first frame based on the first set of spatial characteristics and the first set of visual effects of the first metadata,
  - the manipulation instructions including a second manipulation instruction
  - to integrate the advertising component in the placement zone as depicted in the second frame based on the second set of spatial characteristics and the second set of visual effects of the second metadata;
- wherein the manipulation instructions include instructions that change an appearance of the advertising component between the frames according to the appearance changes of the placement zone;
- receiving an authorization to use the video material with the advertising component from at least one of a right holder of the video material and an advertiser; and
- in response to receiving the authorization, transmitting at least part of the video material, the placement instructions and the advertising component over a distribution network to a remote combining module to allow the remote combining module to combine the video material and the advertising component, based on the placement instructions, wherein playback of the first frame and the second frame provides an animation of the advertising component in the video material.

20. The computer-readable storage medium according to claim 19, wherein the manipulation instructions relate to one or more of:
- shadows, highlights or other lighting effects to be added to the advertising component;
- color of the advertising component;
- tone of the advertising component; opacity of the advertising component; and blurring of the advertising component.

21. The computer-readable storage medium according to claim 19,
- wherein determining the period of time for which the placement zone is visible in the image content with at least the minimum-predetermined area allowing for placement of the advertising component without obscuration that exceeds a particular amount is based on the geometric parameter changes and the appearance changes.

22. The computer-readable storage medium according to claim 19, wherein identifying the appearance changes includes:
- identifying whether an object of the image content obscures at least part of the placement zone; and
- identifying whether illumination of the placement zone changes.

* * * * *